US011388705B2

(12) United States Patent
Li et al.

(10) Patent No.: US 11,388,705 B2
(45) Date of Patent: Jul. 12, 2022

(54) RESOURCE ALLOCATION FOR GRANT-FREE UPLINK (UL) TRANSMISSION VIA RRC SIGNALING

(71) Applicant: CONVIDA WIRELESS, LLC, Wilmington, DE (US)

(72) Inventors: Qing Li, Princeton Junction, NJ (US); Lakshmi R. Iyer, King of Prussia, PA (US); Allan Y. Tsai, Boonton, NJ (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 93 days.

(21) Appl. No.: 16/637,875

(22) PCT Filed: Aug. 9, 2018

(86) PCT No.: PCT/US2018/045961
§ 371 (c)(1),
(2) Date: Feb. 10, 2020

(87) PCT Pub. No.: WO2019/032801
PCT Pub. Date: Feb. 14, 2019

(65) Prior Publication Data
US 2020/0267696 A1 Aug. 20, 2020

Related U.S. Application Data

(60) Provisional application No. 62/544,497, filed on Aug. 11, 2017.

(51) Int. Cl.
*H04W 72/04* (2009.01)
*H04W 76/27* (2018.01)
(Continued)

(52) U.S. Cl.
CPC ....... *H04W 72/042* (2013.01); *H04W 72/044* (2013.01); *H04W 72/10* (2013.01); *H04W 76/27* (2018.02); *H04W 88/02* (2013.01)

(58) Field of Classification Search
CPC . H04W 72/042; H04W 76/27; H04W 72/044; H04W 72/10; H04W 88/10
See application file for complete search history.

(56) References Cited

U.S. PATENT DOCUMENTS 10,764,914 B2 * 9/2020 Li ................... H04W 72/04
2019/0082450 A1 * 3/2019 Ying .................. H04L 1/1874
(Continued)

OTHER PUBLICATIONS

3GPP TS 36.211 V14.3.0, Technical Specification, "3rd Generation Partnership Project; Technical Specification Group Radio Access Network; Evolved Universal Terrestrial Radio Access (E-UTRA); Physical Channels and Modulation Release 14)", Jun. 2017, 195 pages.

(Continued)

*Primary Examiner* — Mewale A Ambaye
(74) *Attorney, Agent, or Firm* — BakerHostetler

(57) ABSTRACT

Methods and systems are disclosed for resource allocation for Grant-free Uplink (UL) transmissions, such as resource allocation via RRC signaling and Resource allocation via LI signaling, and for procedures associated with Grant-free UL transmission, such as for Grant-free operations with RRC signaling and Grant-free operations with PHY signaling.

15 Claims, 17 Drawing Sheets

(51) Int. Cl.
*H04W 72/10* (2009.01)
*H04W 88/02* (2009.01)

(56) References Cited

U.S. PATENT DOCUMENTS

| | | | | |
|---|---|---|---|---|
| 2019/0261354 | A1* | 8/2019 | Fakoorian | H04L 1/1671 |
| 2020/0053713 | A1* | 2/2020 | Bang | H04L 5/0094 |
| 2020/0267755 | A1* | 8/2020 | Ugurlu | H04W 72/042 |
| 2021/0160016 | A1* | 5/2021 | Takeda | H04L 5/0053 |

OTHER PUBLICATIONS

3GPP TS 36.212 V14.3.0, Technical Specification, 3rd Generation Partnership Project; Technical Specification Group Radio Access Network; Evolved Universal Terrestrial Radio Access (E-UTRA); Multiplexing and Channel Coding (Release 14), Jun. 2017, 198 pages.

3GPP TS 36.321 V14.3.0, Technical Specification, "3rd Generation Partnership Project; Technical Specification Group Radio Access Network; Evolved Universal Terrestrial Radio Access (E-UTRA); Medium Access Control (MAC) Protocol Specification (Release 14)", Jun. 2017, 107 pages.

3GPP TS 36.331 V14.3.0, Technical Specification, "3rd Generation Partnership Project; Technical Specification Group Radio Access Network; Evolved Universal Terrestrial Radio Access (E-UTRA); Radio Resource Control (RRC) Protocol Specification (Release 14)", Jun. 2017, 745 pages.

3GPP TSG RAN Wg1 Meeting #89, R1-1707509, CATT, "NR UL Scheduling Mechanism", May 2017, 2 pages.

3GPP TSG RAN WG1 NR Ad-Hoc#2, "RAN1 Chairman's Notes", Jun. 2017, 77 pages.

3GPP TSG RAN WG2 Meeting #95bis, R2-166059, Sierra Wireless, "Transmission of Data Grant-Free in New State", Oct. 2016, 8 pages.

3GPP TSG-RAN WG2 Meeting #6, R2-168050, Samsung, "Design Requirement for Data Transfer in Inactive State", Nov. 2016, 4 pages.

3GPP TSG-RAN WG2 Meeting #98, R2-1705118, Huawei, HiSilicon, "Grant-Free Resource Configuration", May 2017, 4 pages.

ETSI TS 136213 V14.3.0 Technical Specification, "LTE; Evolved Universal Terrestrial Radio Access (E-UTRA); Physical Layer Procedures (3GPP TS 36.213 version 14.3.0 Release 14)", Aug. 2017, 462 pages.

* cited by examiner

RESOURCE ALLOCATION FOR GRANT-FREE UPLINK (UL) TRANSMISSION VIA RRC SIGNALING

CROSS-REFERENCE TO RELATED APPLICATIONS

This application is the National Stage Application of International Patent Application No. PCT/US2018/045961 filed Aug. 9, 2018, which claims the benefit of U.S. Provisional Patent Application No. 62/544,497, filed Aug. 11, 2017, the disclosure of which is incorporated herein by reference in its entirety.

BACKGROUND

Three different resource allocation types are present in 3GPP's Long Term Evolution (LTE): Resource Allocation Types 0, 1, and 2. Each of the different resource allocation types uses a predefined Downlink Control Information (DCI) Format, as described in 3GPP TS 36.213 V14.3.0.

SUMMARY

Methods and systems are disclosed for resource allocation for Grant-free Uplink (UL) transmissions, such as resource allocation via RRC signaling and Resource allocation via L1 signaling, and for procedures associated with Grant-free UL transmission, such as for Grant-free operations with RRC signaling and Grant-free operations with PHY signaling.

An example method disclosed herein may comprise establishing a secure connection to an access network, receiving from the access network a first Radio Resource Control (RRC) connection reconfiguration message comprising one or more grant-free configuration parameters of a grant-free configuration, storing the grant-free configuration at the user equipment; receiving from the access network a second RRC connection reconfiguration message comprising one or more grant-free configuration parameters of an updated grant-free configuration, and updating the stored grant-free configuration at the user equipment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 1A:
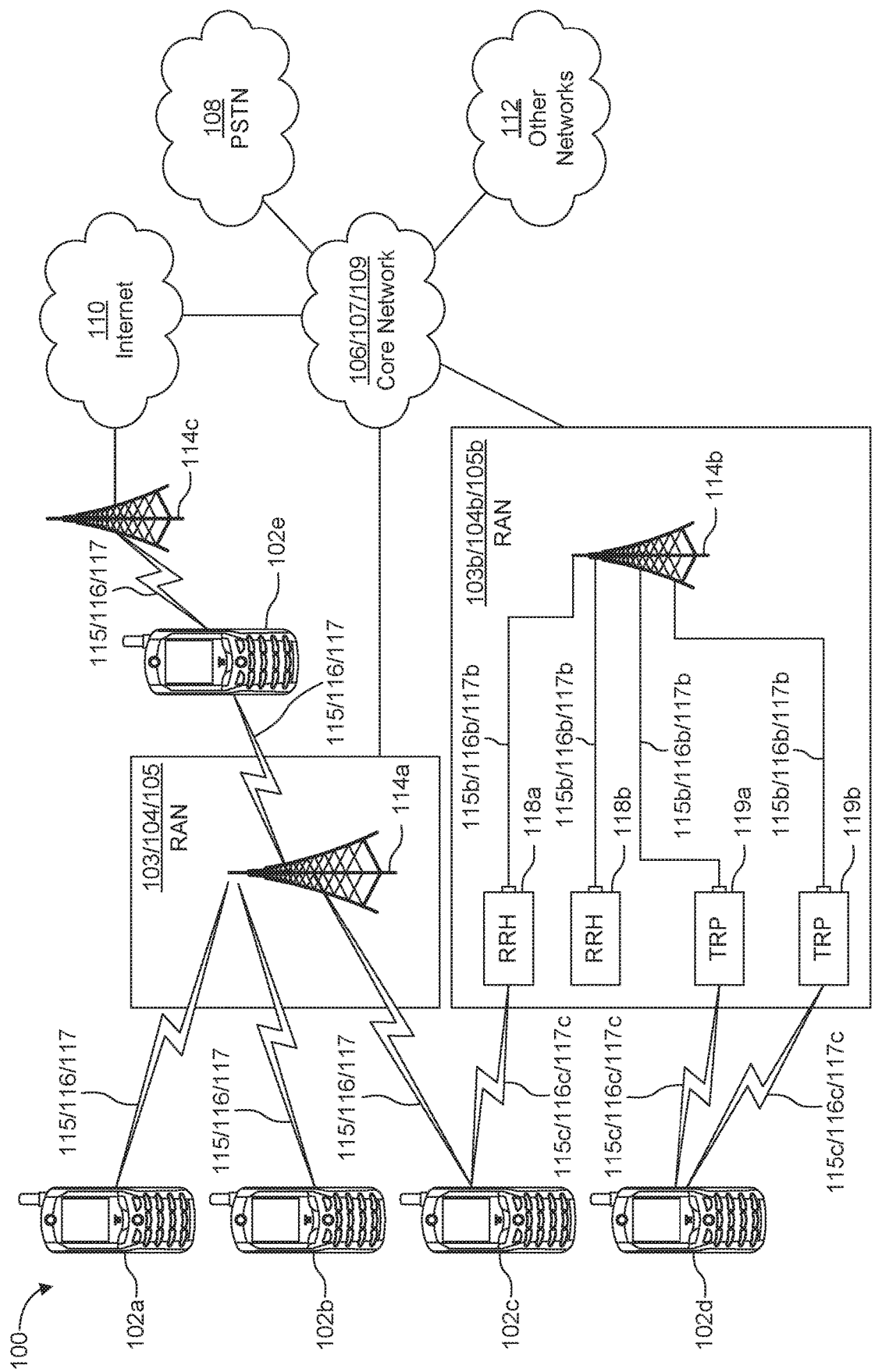
FIG. 1A illustrates one embodiment of an example communications system in which the methods and apparatuses described and claimed herein may be embodied.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+).

HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
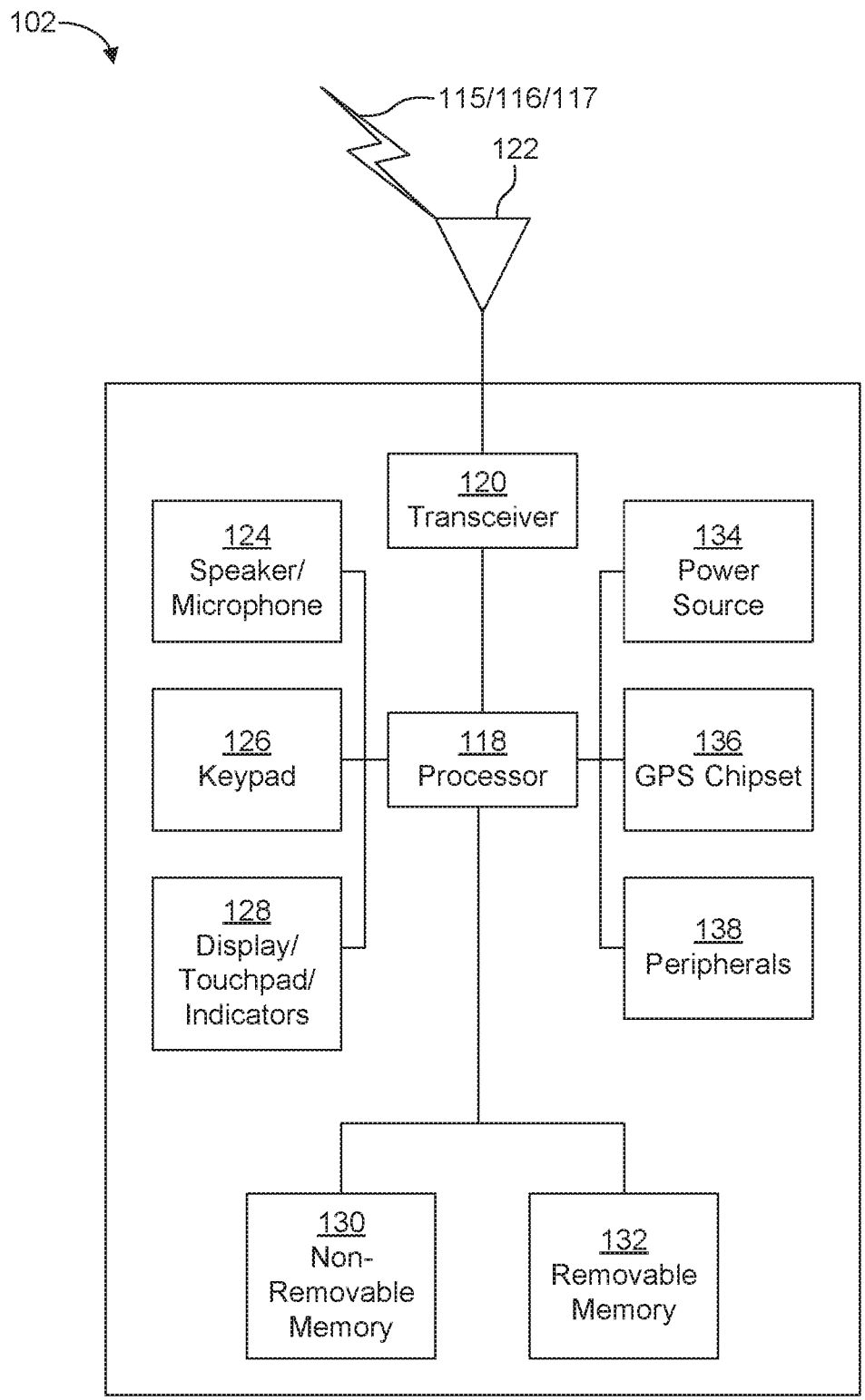
FIG. 1B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/

117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
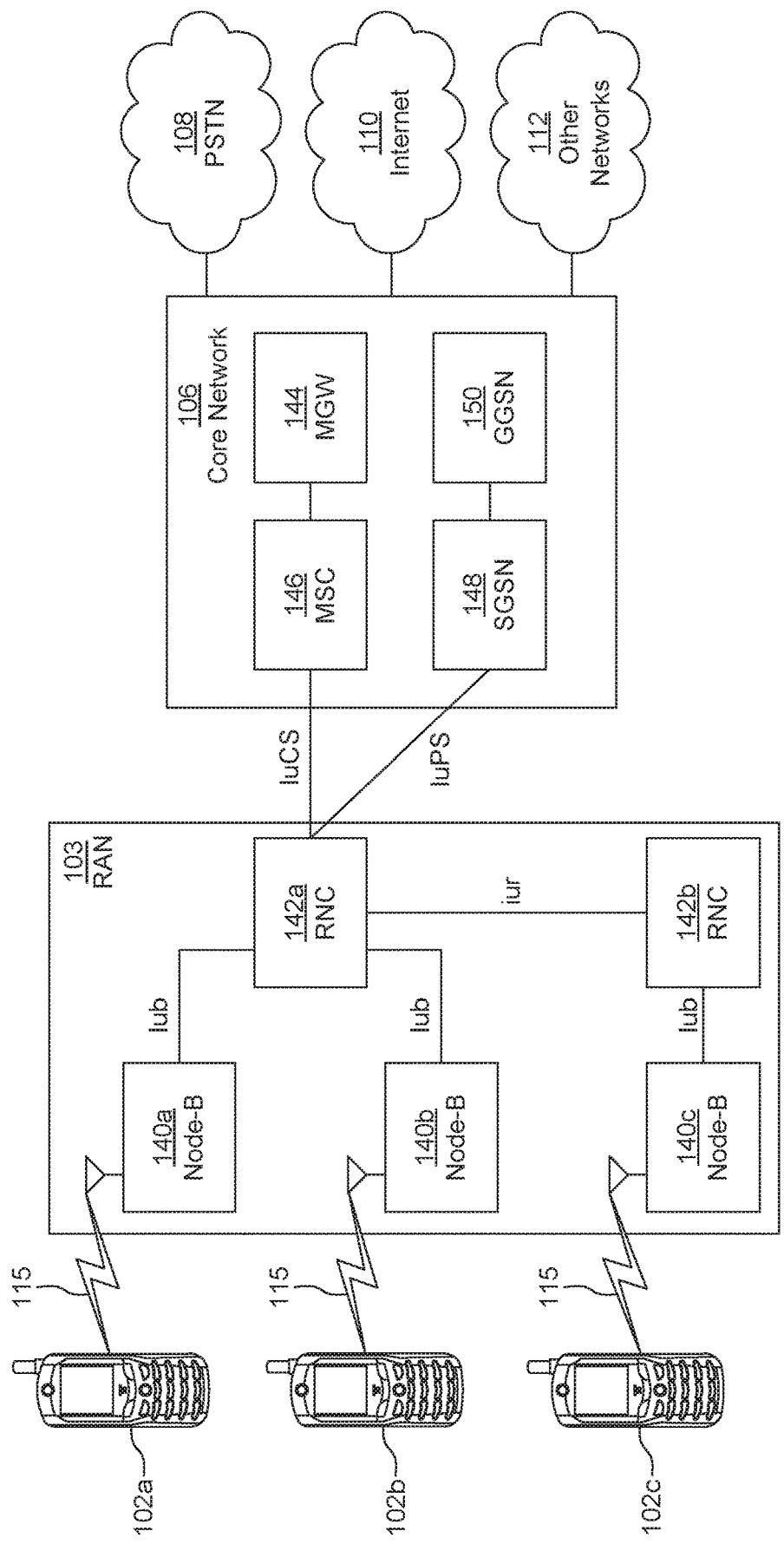
FIG. 1C is a system diagram of an example radio access network (RAN) and core network in accordance with an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
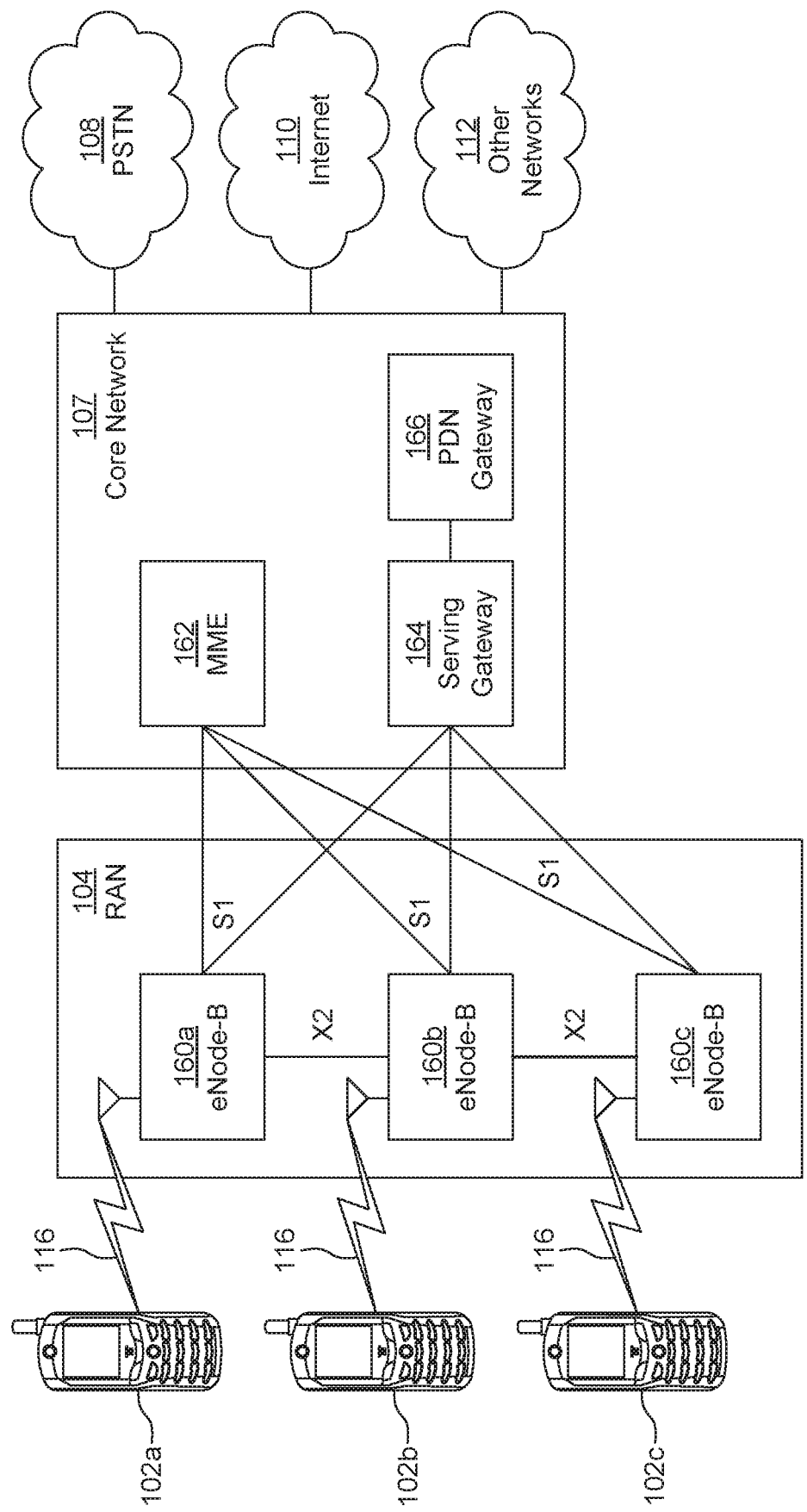
FIG. 1D is another system diagram of a RAN and core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
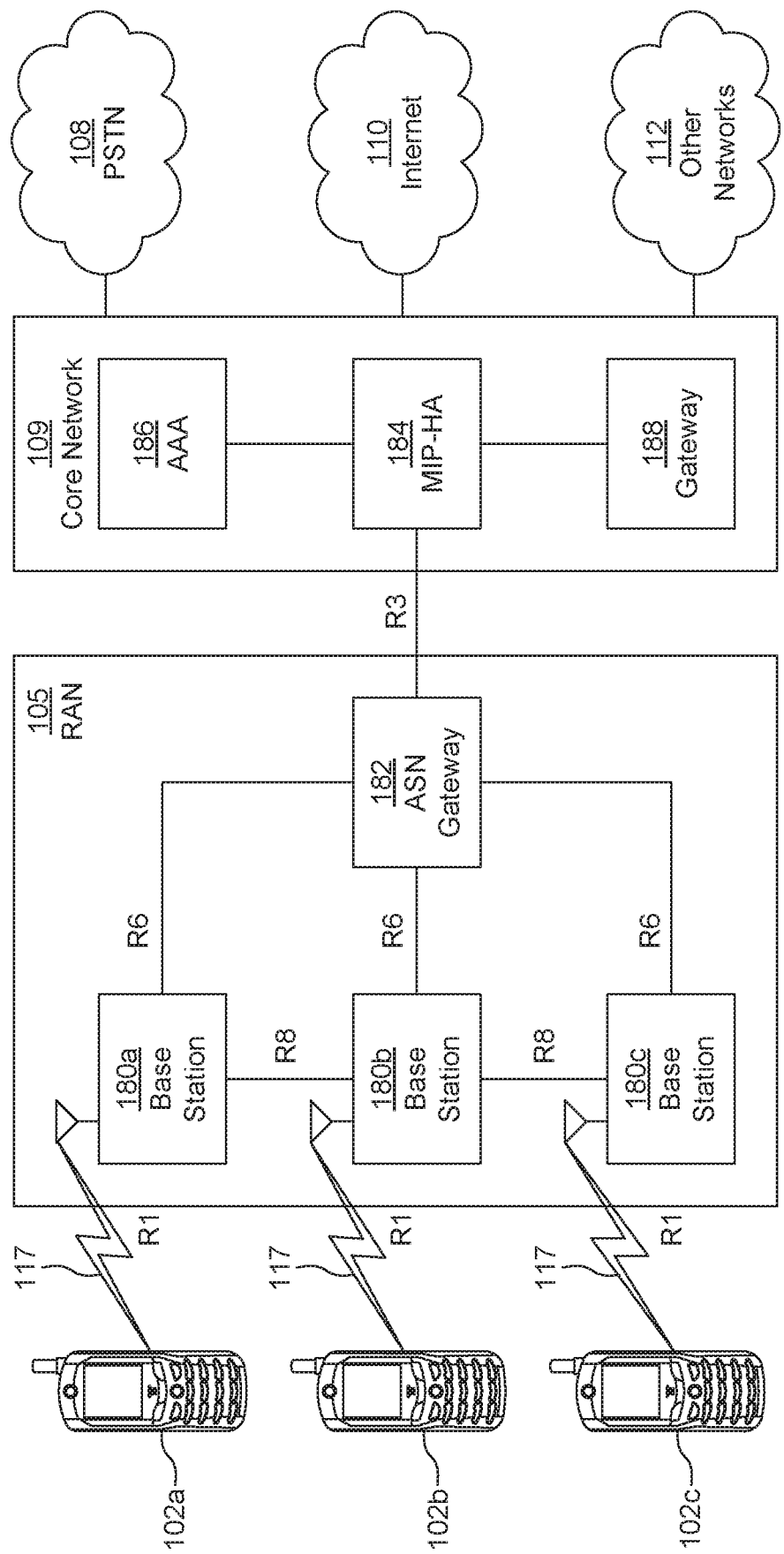
FIG. 1E is another system diagram of a RAN and core network according to another embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
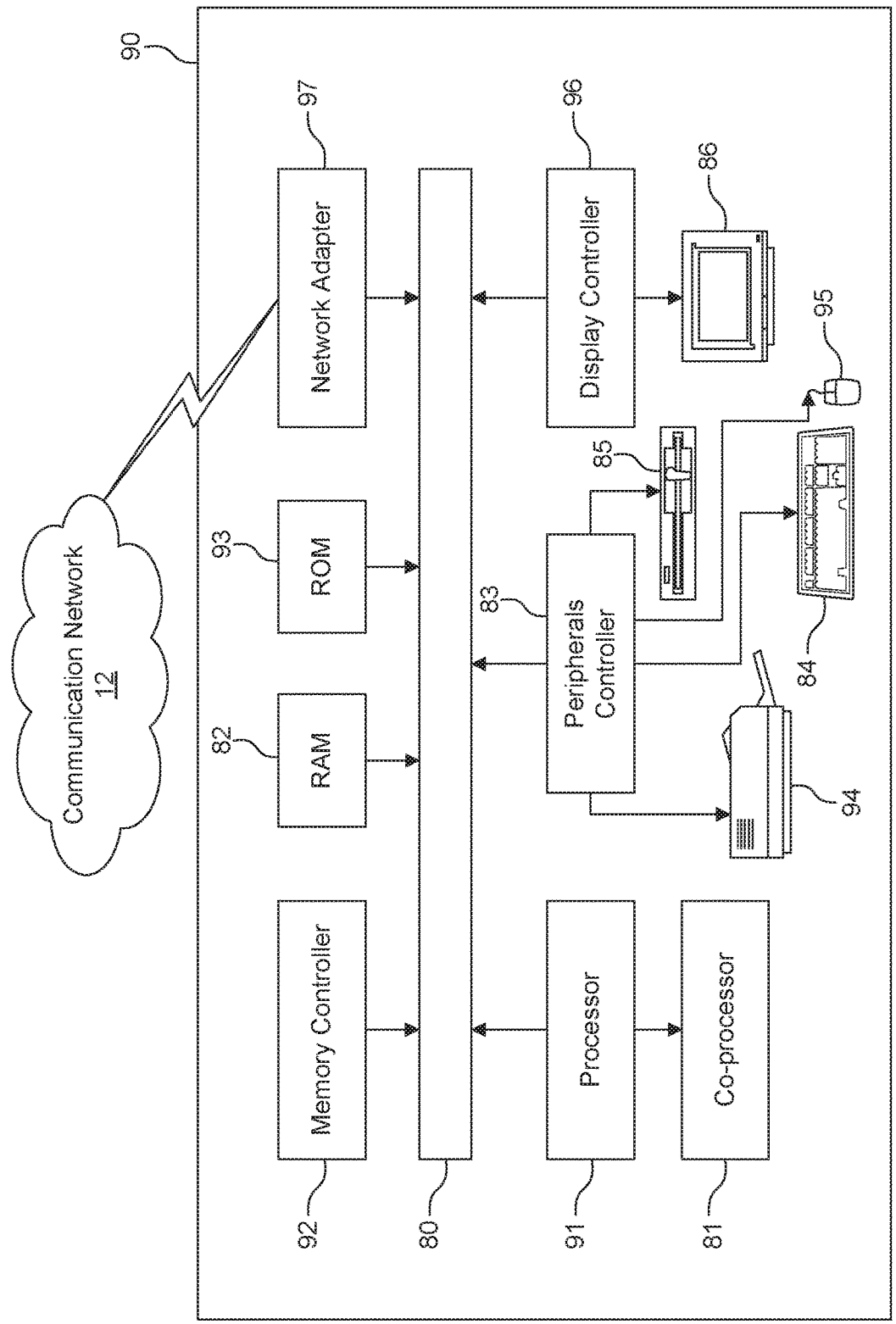
FIG. 1F is a block diagram of an exemplary computing system 90 in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Figure 2:
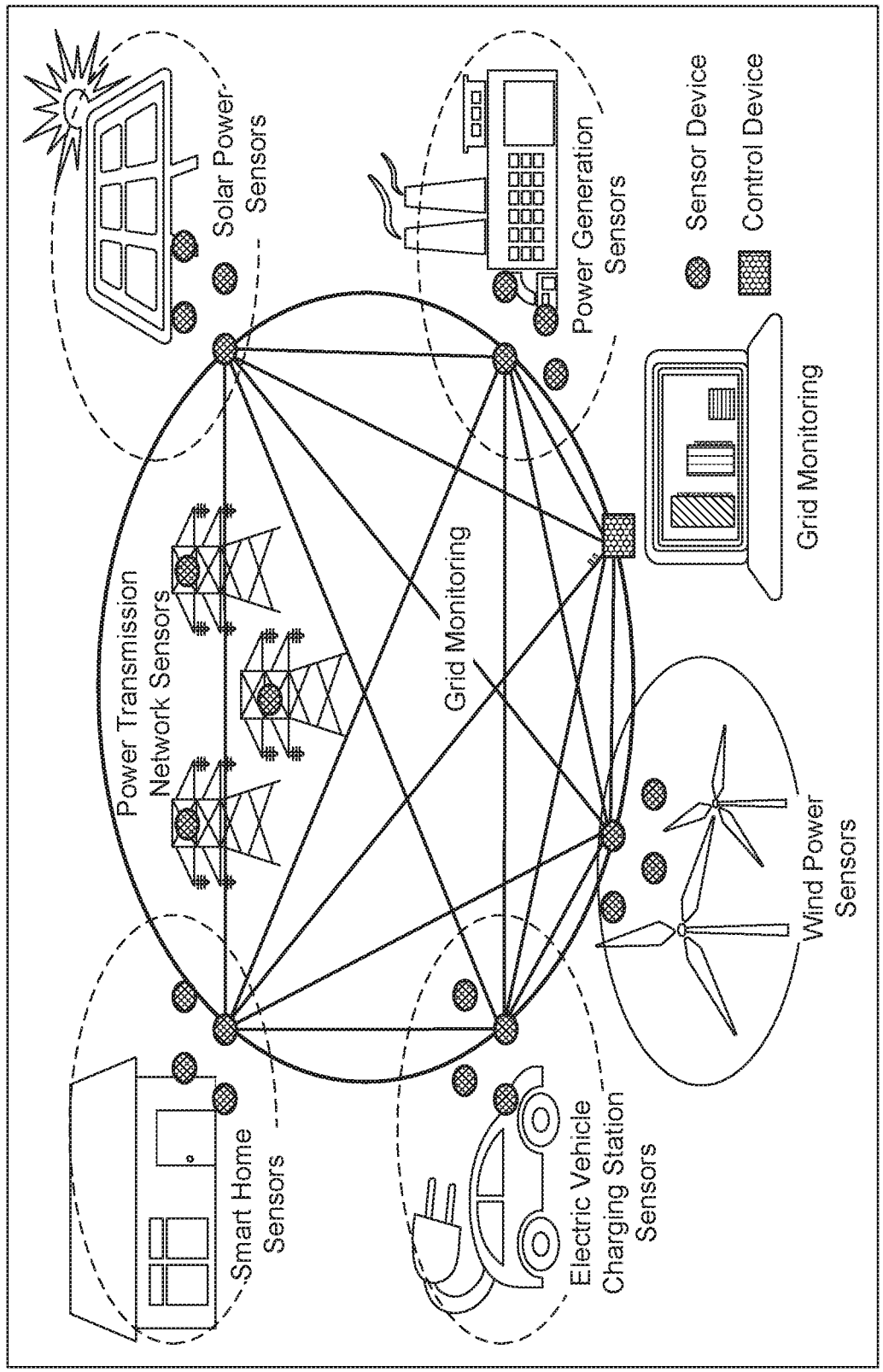
FIG. 2 shows an example power grid of a smart city.

FIG. 2 shows an example use case illustrating different sensors of a Smart City's power grid system. The sensors of a Smart Home (e.g., mMTC devices) may send electrical usage data once per week or once per month with very little latency requirements. Sensors on a Smart City's Power Transmission Network (e.g., URLLC devices) may monitor the power level continually and report to the Grid Monitoring System once in a while, but when an abnormal power level is detected, the sensor(s) may need to send warning data to the Grid Monitoring System immediately so that the Grid Monitoring System may shut down the malfunctioning power supply system and plug in a backup power supply system to avoid any possible damage to the Smart City's power grid and negative impact to the Smart City's operations.

An additional example use case may include forest fire monitoring sensors (e.g., mission critical MTC devices) which send small data periodically with a very low duty cycle, but that may need to send a warning message or messages immediately and reliably. These devices may be located sparsely covering a large area of the forest, and may have a constrained battery life of around 15-20 years.

An additional example use case may include medical devices located in an ambulance sending a patient to the emergency room (e.g., URLLC devices). The medical devices may send the patient's temperature, blood pressure data, and heart monitoring images to the hospital and the doctor's office.

From the above use cases, the URLLC and mMTC devices may be summarized into one or more of the following:

URLLC devices, without battery constraint, may support both small and medium UL data rate transmission with ultra-low latency and very high reliability;

URLLC or mission critical MTC devices, with battery constraint, may support only small UL data rate transmission with ultra-low latency and very high reliability; and mMTC devices, with battery constraint and dense connections, may support only small UL data rate transmission that is either prescheduled or tolerant to long latency.

URLLC devices may fail the latency requirement for UL data transmission using current grant based UL data transmission in the LTE system. For mMTC devices, the signaling overhead for UL grant messages may be very significant compared with the infrequent and small UL data transmitted. This challenges the battery life requirement for the mMTC devices. Therefore, in order to reduce UL transmission signaling latency for URLLC devices and to reduce UL transmission signaling overhead for mMTC devices, methods for configuring and managing the resources for Grant-free UL transmissions and optimizing the operations for Grant-free UL transmissions are discussed herein.

For different RAN architectures, the methods disclosed herein may be conducted at an NR-node or a gNB, a Transmission and Reception Point (TRP), or a Remote Radio Head (RRH), as well as the central controller in RAN or control functions in a RAN slice. All of the methods are applicable to an NR-node/gNB, TRP, RRH, central controller, and control function in different RAN architectures. In addition, the terms Grant-free and Grant-less are fully interchangeable under the scope of methods disclosed herein.

Methods and systems for resource allocation for Grant-free UL transmission are disclosed. In order to ensure a high successful rate for contention based grant-free UL accessing, to avoid unnecessary interference to the other devices of services, and to optimize the overall UL resource utilizations in the NR system, a NR radio access network node (e.g., a NR-node or gNB) may manage the grant-free access allocation(s) for UL transmissions. The access allocations may be configured and further managed by a NR-node either statically or dynamically.

A UE may need to know the grant-free access allocation before conducting a grant-free UL transmission. A grant-free allocation may contain one or more of a physical resource allocation for grant-free access and configuration parameters for grant-free access.

A physical resource allocation may be described as:

Grant-free Access Resource (GAR)={time, frequency, space}.

If a Grant-free Time Interval (GTI) is denoted for time, Grant-free Frequency Range (GFR) is denoted for frequency, and Grant-free Beam (GB) is denoted for space, then:

GAR (i)={GTI(i), GFR(i), GB(i)} (i=1, 2, 3, . . . , N),
where:

GTI=contiguous or noncontiguous in time units which may be radio frames (e.g., System Frame Number (SFN)), Sub-Frame(SF), Slot, Mini-slot (e.g., a time interval in symbols within a slot), symbol, etc.;

GFR=contiguous or noncontiguous in frequency units which may be Resource Blocks (RBs) or Resource Block Groups (PRGs), etc.; and GB=beams or beam groups which may be beam (group) ID or index of ports, beam pair (group) ID or index of ports, etc.

If a Grant-free Access Block (GAB) (e.g., one Grant-free access location) is denoted as GAB (i)={GTI(i), GFR(i)}, then: GAR (i)={GAB(i), GB(i)} (i=1, 2, 3, . . . , N).

The above represents that a Grant-free access allocation may be a combination of Grant-free Access Block allocation and Grant-free Beam (or Beam Pair) allocation. However, a Grant-free access allocation may be a combination of one or multiple Grant-free Access Block allocations and one or multiple Grant-free Beam (or Beam Pair) allocations.

Figure 3A:
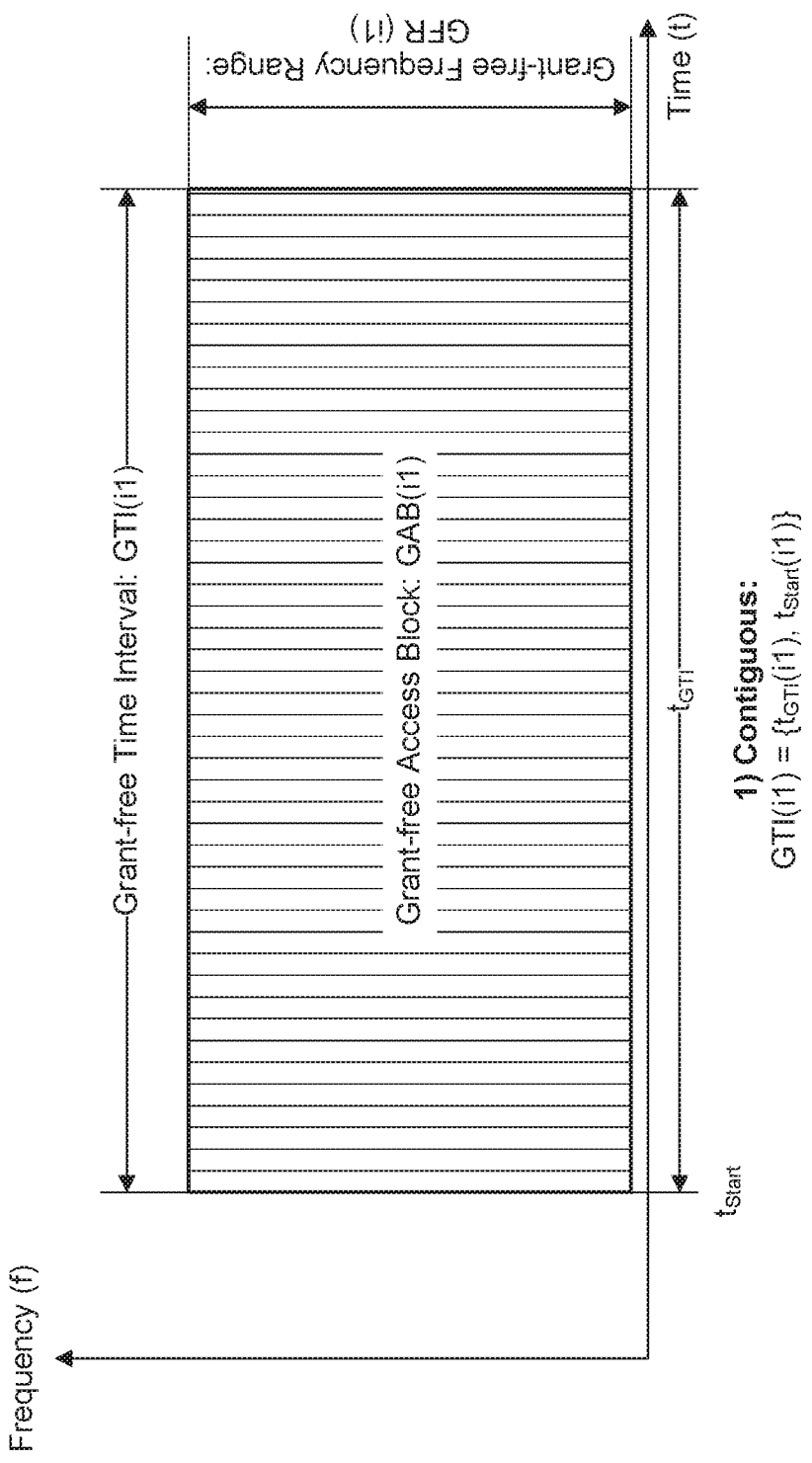
FIG. 3A shows an example of contiguous Grant-free time allocations.

FIG. 3 illustrates three example different types of Grant-free Access Allocation in time as follows:

Contiguous: as illustrated in FIG. 3A, the Grant-free Access Allocation in time GFI (i1) can be defined with GTI(i1)={$t_{GTI}$(i1), $t_{Start}$(i1)}, where $t_{GTI}$ is for the allocation time duration within which at least one data transmission and retransmission may be completed, and $t_{Start}$ is for the starting point in time relative to the system reference such as the radio frame (e.g., System Frame Number (SFN), subframe within a radio frame, or slot of a subframe). For example, the allocation in time may be defined with a starting point $t_{Start}$ in subframe of a radio frame, in slot of a frame or subframe, or in symbol of a slot or mini-slot, and a time duration or length $t_{GTI}$ in frame, subframe, slot, mini-slot or symbol. For multiple time allocations, a set of $t_{GTI}$ and a set of $t_{Start}$ may be defined accordingly, wherein each element in a set may have same or different values. A simplified case may be exemplified with $t_{GTI}$=28 symbols or 2 slots with 14 symbols in each slot, and $t_{Start}$=4th symbol of the starting slot.

Figure 3B:
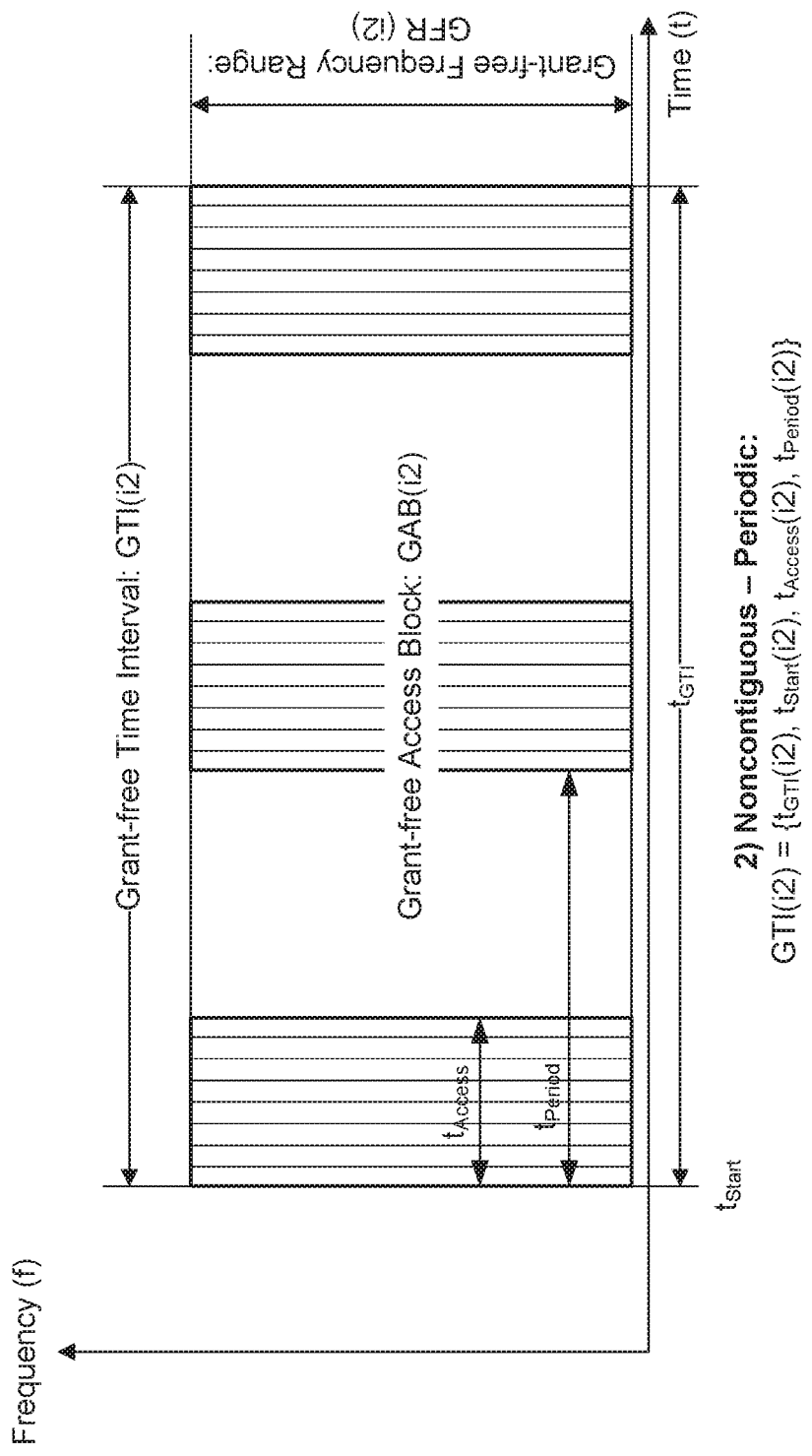
FIG. 3B shows an example of noncontiguous, periodic Grant-free time allocations.

Noncontiguous—periodic: as illustrated in FIG. 3B, the Grant-free Access Allocation in time GFI (i2) can be defined with GTI(i2)={$t_{GTI}$(i2), $t_{Start}$(i2), $t_{Access}$(i2), $t_{Period}$(i2)}, where $t_{GTI}$ is for the allocation time duration within which at least one data transmission and retransmission may be completed, $t_{Start}$ is for the starting point in time relative to the system reference such as the radio frame (e.g., System Frame Number (SFN), subframe within a radio frame, or slot of a subframe), $t_{Access}$ is for an allowed accessing time window within which a grant-free accessing (e.g., transmission and repetition(s)) may be conducted any time, and $t_{Period}$ is for period. For example, the allocation in time may be defined with a time duration $t_{GTI}$ in frames, subframes, slots or mini-slots, or symbols, a starting point $t_{Start}$ in subframe of a frame, in slot or mini-slot of a frame or subframe, or in symbol of a slot or mini-slot, an accessing window $t_{Access}$ in subframe, slot or mini-slot, or symbol, and a period $t_{Period}$ in subframe, slot or mini-slot, or symbol. For multiple time allocations, a set of $t_{GTI}$, a set of $t_{Start}$, a set of $t_{Access}$ and a set of $t_{period}$ may be defined accordingly, wherein each element in a set may have the same or different values. A simplified case may be exemplified with $t_{GTI}$=4 subframes (e.g., there is 1 slot in each subframe and 14 symbols in each slot), $t_{Start}$=7th symbol of each 14-symbol slot, $t_{Access}$=2 symbols in length starting from $t_{Start}$ (e.g., 7th symbol) of each slot, and $t_{Period}$=14 symbols, which allocates 2-symbol accessing window starting at the 7th symbol in each slot or subframe for the duration of 4 subframes.

Figure 3C:
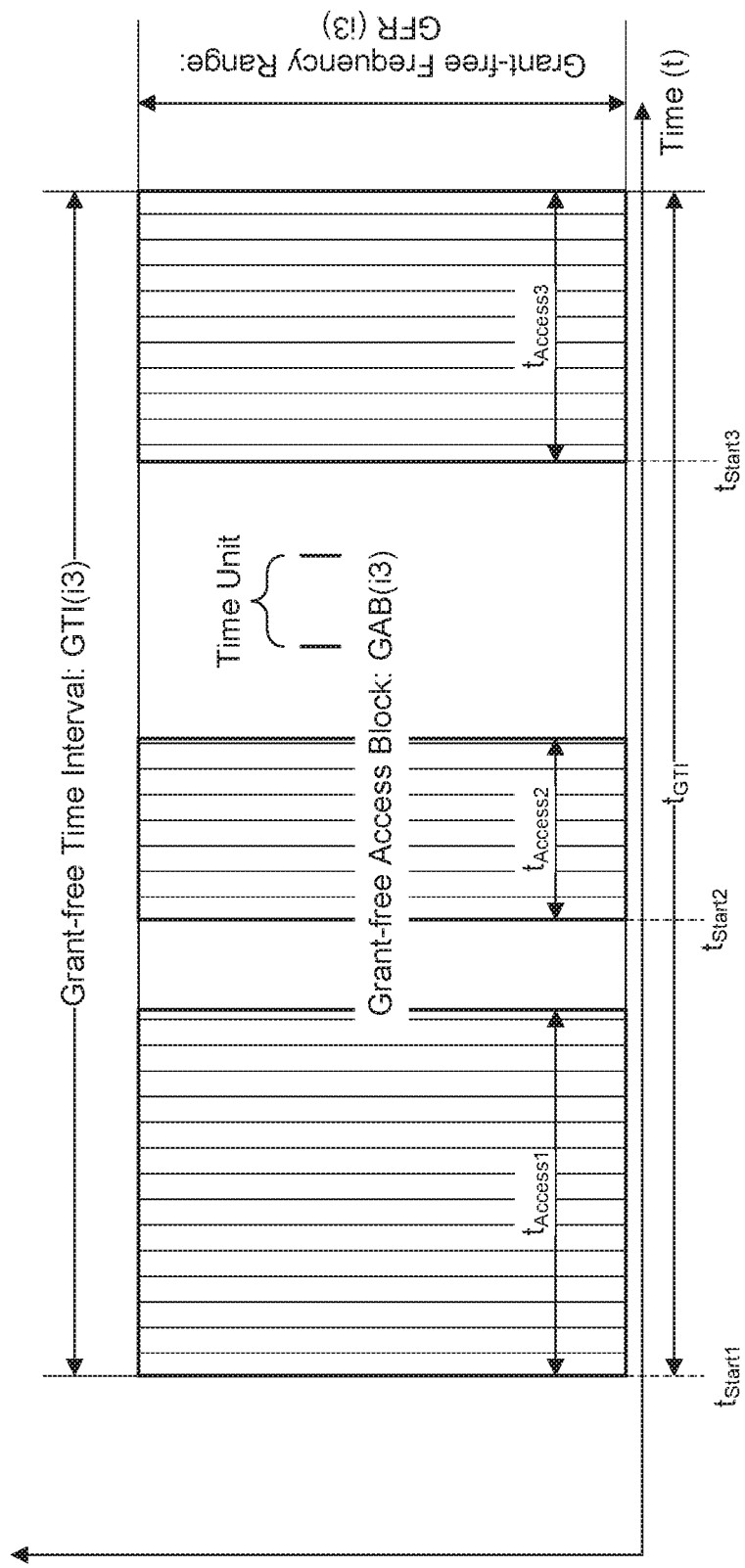
FIG. 3C shows an example of noncontiguous, aperiodic Grant-free time allocations.

Noncontiguous—aperiodic: as illustrated in FIG. 3C, the Grant-free Access Allocation in time GFI (i3) can be defined with GTI(i3)={$t_{GTI}$(i3), $t_{Start1}$(i3), $t_{Start2}$(i3), $t_{Start3}$(i3), $t_{Access1}$(i3), $t_{Access2}$(i3), $t_{Access3}$(i3)}, where $t_{GTI}$ is for the allocation time duration within which at least one data transmission and retransmission may be completed, $t_{Start1}$ is for the first starting point in time relative to the system reference such as the radio frame (e.g., System Frame Number (SFN), subframe within a radio frame, or slot of a subframe), and $t_{Access1}$ is for the first access time window of the accessing time windows {$t_{Access1}$, $t_{Access2}$, $t_{Access3}$, $t_{AccessM}$} (M>1) within which a grant-free accessing (e.g., transmission and repetition(s)), may be conducted any time.

For example, the allocation in time may be defined with a time duration $t_{GTI}$ in frames, subframes, slots or mini-slots, or symbols, a list of starting points $\{t_{Start1}, t_{Start2}, t_{Start3}, \ldots, t_{StartM}\}$ (M>1) in subframe of a frame, in slot of a frame or subframe, or in symbol of a slot or mini-slot, a list of accessing windows $\{t_{Access1}, t_{Access2}, t_{Access3}, \ldots, t_{AccessM}\}$ (M>1) in subframe, slot or mini-slot, or symbol. For multiple time allocations, a set of $t_{GTI}$, a set of $t_{Start}$ list and a set of $t_{Access}$ list may be defined accordingly, wherein each element in a set may have same or different values. A simplified case may be exemplified with $t_{GTI}$=4 subframes (e.g., there is 1 slot in each subframe and 14 symbols in each slot), $t_{Start1}$=4th symbol of each 14-symbol slot, and $t_{Access1}$=2 symbols in length within the slot (e.g., a 2-symbol mini-slot), $t_{Start2}$=10th symbol of the slot, $t_{Access2}$=4 symbols in length within the slot (e.g., a 4-symbol mini-slot). This pattern may be repeated in each slot of the 4 subframes allocated for Grant-free access.

One or more of the above mentioned time parameters may be defined with a reference time unit such as radio frame (e.g., SFN), subframe, slot, mini-slot or symbols, which may be specified, configured, and/or broadcasted with System Information (SI). They may also be statically or semi-statically configured with Radio Resource Control (RRC) signaling or Medium Access Control (MAC) Control Element (CE), and/or dynamically signaled with Downlink Control Information (DCI) on the Physical Downlink Control Channel (PDCCH) in a NR system. The format of these time parameter values may be in an enumerated description, such as $t_{GTI}$ value(s) for the allocation time duration(s), $t_{Start}$ value(s) for the starting point(s), $t_{Access}$ value(s) for allowed accessing time window(s), and $t_{Period}$ value(s) for period(s), as exampled in the RRC messages described herein. Another example of a time allocation description is a string of bitmap per the time unit specified or configured by the NR system. For example, Symbol 1 through Symbol N of a slot are mapped from MSB to LSB of N bit string of the bitmap to indicate the symbols allocated for Grant-free access, e.g., "1" of MSB indicates symbol 1 is allocated for Grant-free access. Another example is a bitmap for each mini-slot or slot in a subframe or frame to indicate the mini-slots or slots allocated for Grant-free access.

Figure 4A:
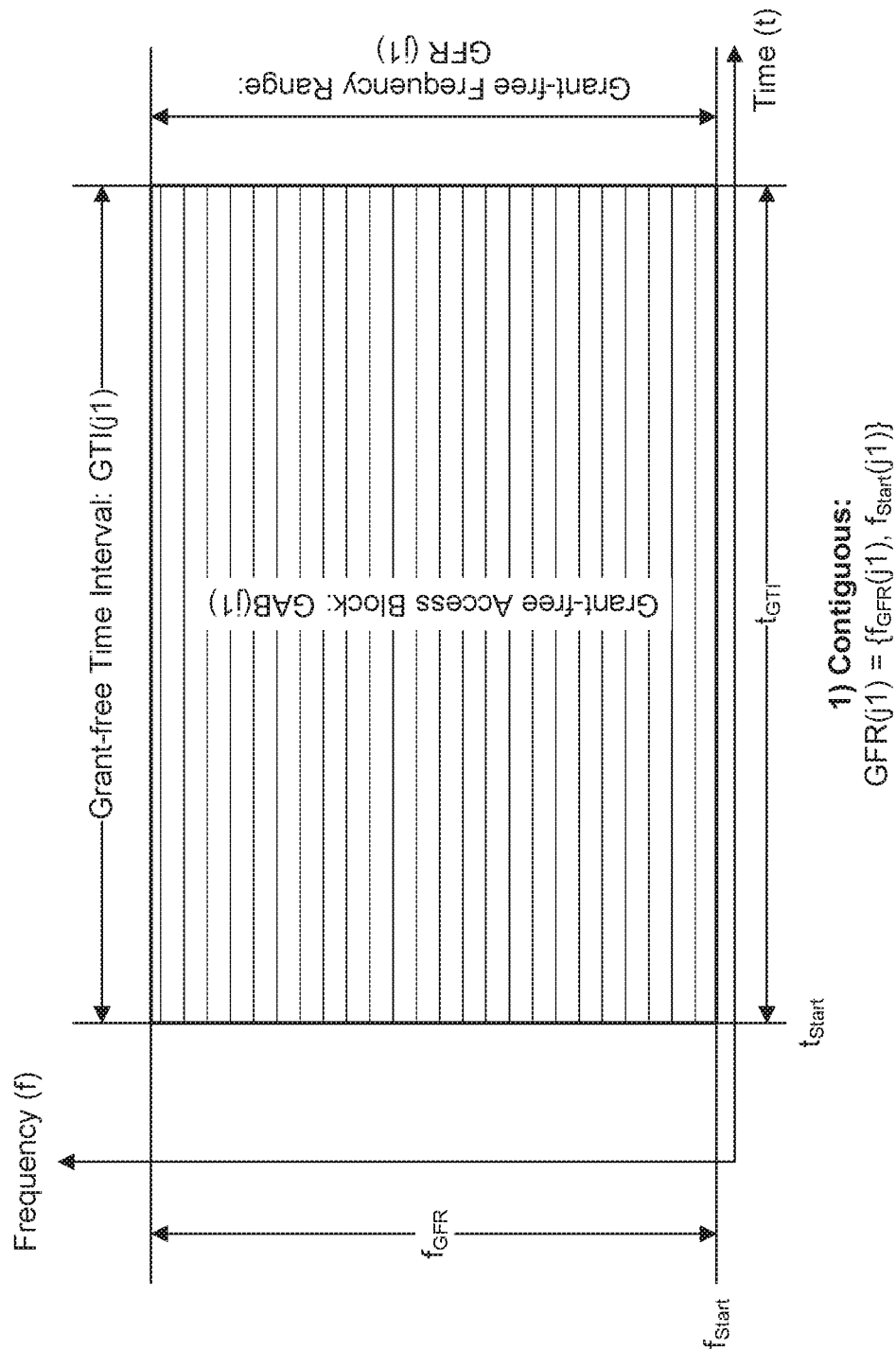
FIG. 4A shows an example of contiguous Grant-free frequency allocations.

FIG. 4 illustrates three example different types of Grant-free Access Allocation in frequency as the follows:

Contiguous: as illustrated in FIG. 4A, the Grant-free Access Allocation in frequency GFR (j1) can be defined with GFR(j1)=$\{f_{GFR}(j1), f_{Start}(j1)\}$, where $f_{GFR}$ is for the allocation frequency range and $f_{Start}$ is for the starting point in frequency relative to the system reference, e.g., the first subcarrier, the first Resource Block (RB) containing a group of contiguous subcarriers (e.g., 12 contiguous subcarriers), or the first Resource Block Group (RBG) containing a group of contiguous Resource Blocks of the operation band or of the system. For example, the allocation in frequency may be defined by a frequency range $f_{GFR}$ in RBs or RBGs and a starting point $f_{Start}$ in subcarrier, RB or RBG. For multiple frequency allocations, a set of $f_{GFR}$ and a set of $f_{Start}$ may be defined accordingly, wherein each element in a set may have the same or different values. A simplified case may be exemplified with $f_{GTI}$=100 RBs or RBGs and $f_{Start}$=10th RB or RBG referenced from the system RB0 or RBG0 respectively, where RB or RBG applied herein may be configured or indicated by the gNB.

Figure 4B:
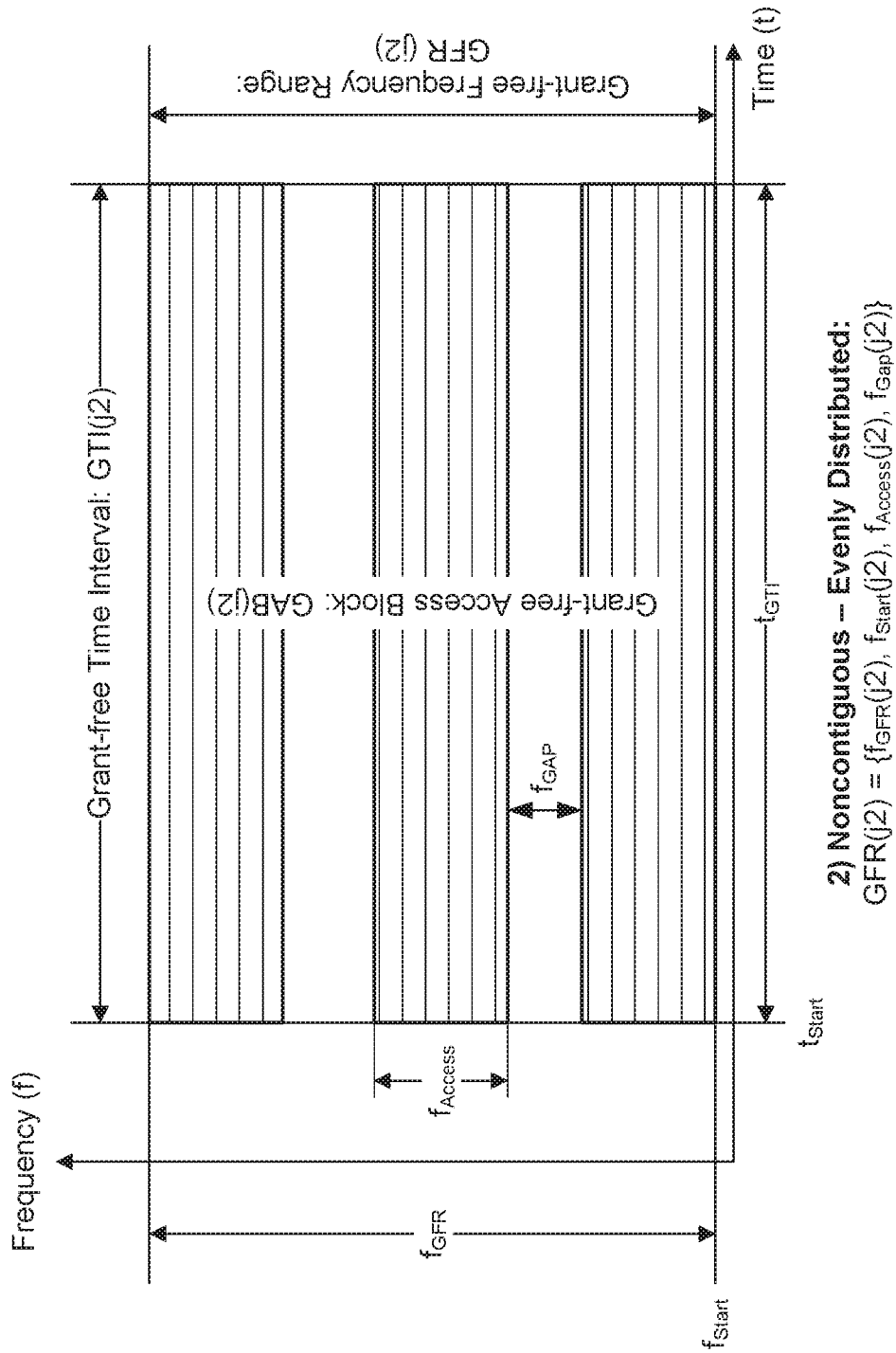
FIG. 4B shows an example of noncontiguous, evenly distributed Grant-free frequency allocations.

Noncontiguous—evenly distributed: as illustrated in FIG. 4B, the Grant-free Access Allocation in frequency GFR (j2) can be defined with GFR(j2)=$\{f_{GFR}(j2), f_{Start}(j2), f_{Access}(j2), f_{Gap}(j2)\}$, where $f_{GFR}$ is for the allocation frequency range, $f_{Start}$ is for the starting point in frequency relative to the system reference such as the first subcarrier, the first RB, or the first RBG of the operation band or of the system, $f_{Access}$ is for contiguous frequency resource subset, and $f_{Gap}$ is the gap between contiguous frequency resource subsets. For example, the allocation in frequency may be defined by a frequency range $f_{GFR}$ in RBs or RBGs, a starting point $f_{Start}$ in subcarrier, RB or RBG, a contiguous frequency resource subset $f_{Access}$, and a gap $f_{Gap}$. For multiple frequency allocations, a set of $f_{GFR}$, a set of $f_{Start}$, a set of $f_{Access}$, and a set of $f_{Gap}$ may be defined accordingly, wherein each element in a set may have same or different values. A simplified case may be exemplified with $f_{GTI}$=110 RBGs, $f_{Start}$=1st RBG of the operation band, $f_{Access}$=20 RBGs, and $f_{Gap}$=10 RBGs.

Figure 4C:
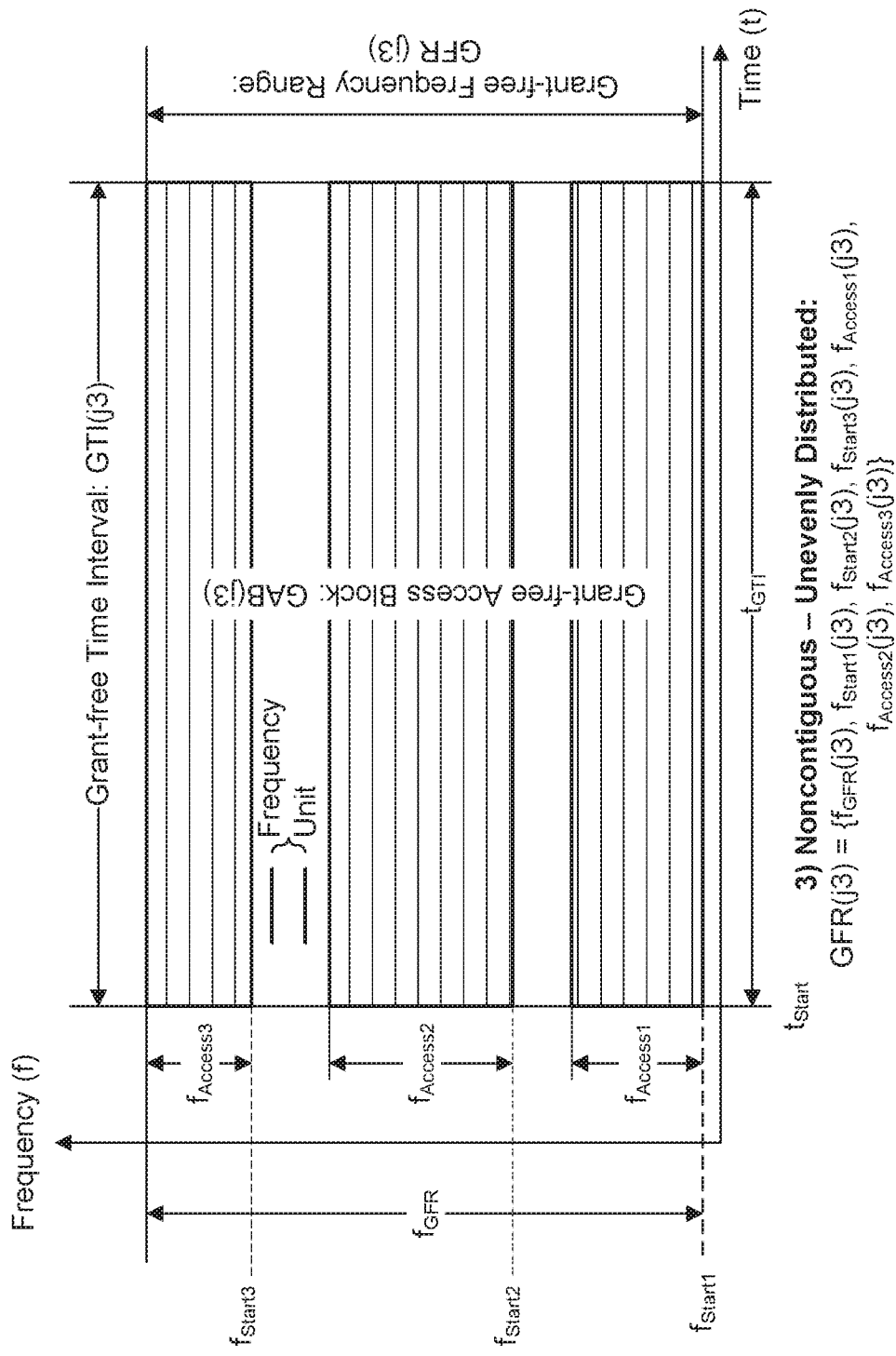
FIG. 4C shows an example of noncontiguous, unevenly distributed Grant-free frequency allocations.

Noncontiguous—unevenly distributed: as illustrated in FIG. 4C, the Grant-free Access Allocation in frequency GFR (j3) can be defined with GFR(j3)=$\{f_{GFR}(j3), f_{Start1}(j3), f_{Start2}(j3), f_{Start3}(j3), f_{Access1}(j3), f_{Access2}(j3), f_{Access3}(j3)\}$, where $f_{GFR}$ is for the allocation frequency range, $f_{Start1}$ is for the first starting point in frequency relative to the system reference, and $f_{Access1}(j3)$ is the first subset of a set of different contiguous frequency resources (e.g., with same or different lengths separated with same or different gaps) $\{f_{Access1}, f_{Access2}, f_{Access3}, \ldots, f_{AccessN}\}$ (N>1). For example, the allocation in frequency may be defined by a frequency range $f_{GFR}$ in RBs or RBGs, a list of starting points $\{f_{Start1}, f_{Start2}, \ldots, f_{StartN}\}$ (N>1) in subcarrier, RB or RBG, and a list of contiguous frequency resource subsets $\{f_{Access1}, f_{Access2}, \ldots, f_{AccessN}\}$ (N>1). For multiple frequency allocations, a set of $f_{GFR}$, a set of $f_{Start}$ list, and a set of $f_{Access}$ list may be defined accordingly, wherein each element in a set may have the same or different values. A simplified case may be exemplified with $f_{GTI}$=110 RBs, $f_{Start1}$=1st RB of the operation band, $f_{Access1}$=40 RBs, $f_{Start2}$=51st RB of the operation band, $f_{Access2}$=30 RBs, $f_{Start3}$=91st RB of the operation band, and $f_{Access3}$=20 RBs.

Each of the above mentioned frequency parameters may be defined with a reference frequency unit such as a Resource Block Group (RBG), a Resource Block (RB), or a subcarrier, which may be specified, configured, and/or broadcasted with System Information (SI). They may also be statically or semi-statically configured with RRC signaling or MAC CE, and/or dynamically signaled with DCIs on the NR-PDCCH in a NR system. The format of these frequency parameter values may be in an enumerated description, such as an $f_{GFR}$ value for a allocation frequency range, an $f_{Start}$ value for a starting point in frequency relative to the system reference, and an $f_{Access}$ value for a contiguous frequency resource subset, or a list of values for each parameter as exampled in the RRC messages described herein. Another example of frequency allocation description is a string of bitmap per the frequency unit configured by the NR system, such as a bitmap for each RB or RBG within the frequency range $f_{GFR}$ to indicate each RB or RBG allocation for Grant-free access. For example, with RB0 to RB9 mapped from MSB to LSB as 1111000111 (e.g., RB0-RB3 and RB7-RB9 are allocated).

The configuration parameters for grant-free access may contain one or more of the following:

UE specific Demodulation Reference Signal (DMRS): such as the initial state, cyclic shifting or Orthogonal Cover Code (OOC) for Code Division Multiplexing (CMD), scrambling, port, etc., which may also be used to identify the UE;

Hybrid Automatic Repeat reQuest (HARQ): such as HARQ process number, HARQ process ID for asynchronic HARQ, Redundant Version (RV);

Maximum repetition K before receiving an Acknowledgement (ACK) or Negative Acknowledgement (NACK);

Modulation and Coding Scheme (MSC);

Transmit Block Size (TBS);

Timing adjustment: such as the Timing Adjust (TA) timer, reference time for TA estimation, etc.;

UL transmit power control: such as the target power P0 for a UE at gNB, power incremental adjustment for open loop, reference power, and scaling of path loss estimation, and power beam index for closed loop, etc.;

Frequency hopping, such as enable or disable frequency hopping, hopping pattern if enables;

Access Channel: contention based or not, accessing priority if contention based, etc.; and/or A new UE identifier Grant-free C-RNTI configured by RRC configuration grantfree-Config. This UE ID may be used for scrambling the DCI for Grant-free operations.

An example of RRC configuration and re-configuration is shown below, using the dedicated resource at RRC-CONNECTED state for a URLLC UE, which may need short grant-free time interval with fine time granularity such as at slot/mini-slot or even symbol level, but much more frequency resources by using RBG instead of RB.

```
RRCConnectionSetup-r8 :: = SEQUENCE {                          //Set up at RRC CONNECTED
    ...
    radioResourceConfigDedicated RadioResourceConfigDedicated OPTIONAL,
    ...
}
...
RRCConnectionReconfiguration-r8 ::= SEQUENCE {                 // Reconfigure at
RRC_CONNECTED
    ...
    radioResourceConfigDedicated RadioResourceConfigDedicated OPTIONAL,
    ...
}
RadioResourceConfigDedicated ::= SEQUENCE {                    // Dedicated resource at
RRC_CONNECTED
    ...
    grantfree-Config Grantfree-Config OPTIONAL,
    ...
}
Grantfree-Config :: = SEQUENCE {                               // Grant-free configuration
    grantfreeC-RNTI grantfreeC-RNTI OPTIONAL,                  // Grant-free C-RNTI to UE
    grantfree-ConfigUL Grantfree-ConfigUL OPIIONAL
}
Grantfree-ConfigUL :: = CHOICE {
    release NULL,
    setup SEQUENCE {
        GrantfreeTimeIntervalUL ENUMERATED {                   // t_GTI values in subframe
            sf10, sf20, sf32, sf40, sf64, sf80, sf128, sj160, sf320, sf640, spare6, spare5,
            spare4, spare3, spare2, spare1},                   // * sf10: 10 subframes
        GrantfreeTimeStartUL ENUMERATED {                      // t_Start values in subframe
            sf1, sf2, sf3, sf4, sf5, sf6, sf7, sf8, sf9, sf10, spare6, spare5,
            spare4, spare3, spare2, spare1},
        GrantfreeTimeAccessUL ENUMERATED {                     // t_Access values in subframe
            sf1, sf2, sf3, sf4, sf5, sf6, sf7, sf8, sf9, sf10, spare6, spare5,
            spare4, spare3, spare2, spare1},
        ...
        GrantfreeFrequencyRangeUL ENUMERATED {                 // f_GFR values in RBG
            rbg10, rbg20, rbg30, rbg40, rbg60, rbg80, rbg100, rbg120, rbg160, rbg200,
            spare6, spare5, spare4, spare3, spare2, spare1},   // * rbg10: 10 RBGs
        GrantfreeFrequencyStartUL ENUMERATED {                 //f_Start values in RB
            rb1, rb2, rb3, rb4, rb5, rb6, rb7, rb8, rb9, rb10, spare6, spare5, spare4,
            spare3, spare2, spare1},                           // * rb1: 1 RB
        GrantfreeFrequencyAccessUL ENUMERATED {                f_Access values in RBG
            rbg2, rbg4, rbg6, rbg8, rbg10, rbg20, rbg30, rbg40, rbg50, rbg60, spare6,
            spare5, spare4, spare3, spare2, spare1},
        ...
        GrantfreeUeDmrsInitStateUL SEQUENCE {00010010...0},    // UE's DMRS Initial State
        ...
        GrantfreeHarqProNumberUL INTEGER (0..8) {4},           // HARQ Process Number=4
        GrantfreeHarqRvUL INTEGER (0..8) {1},                  // HARQ RV=1
        ...
        GrantfreeMaxRepetitionUL INTEGER (0..8) {4},           // Max Repetition K=4
        ...
        GrantfreeMcsUL ENUMERATED {                            // MCS
            mcs1, mcs2, mcs3, mcs4, mcs5, mcs6, mcs7, mcs8, mcs9, mcs10, spare6,
            spare5, spare4, spare3, spare2, spare1},
        GrantfreeTbUL ENUMERATED {                             // TB Size
            tb1, tb2, tb3, tb4, tb5, tb6, tb7, tb8, tb9, tb10, spare6, spare5, spare4, spare3,
            spare 2, spare 1},
        ...
        GrantfreeTimeRefUL ENUMERATED {                        // Time Reference for TA
            tr1, tr2, tr3, tr4, spare4, spare3, spare2, spare1},
        ...
        GrantfreeTrPower0UL ENUMERATED {                       // Transmit Power target
            tp1, tp2, tp3, tp4, spare4, spare3, spare2, spare1},
```

```
        GrantfreePowerRefUL ENUMERATED {                    // Power Reference for Path loss
            pr1, pr2, pr3, pr4, spare4, spare 3, spare2, spare1},
        GrantfreePowerIncUL ENUMERATED {                    // Power Increment
            pi1, pi2, pi3, pi4, spare4, spare3, Spare2, spare1},
        GrantfreeFreqHopUL (0..1) {1},                      // Frequency Hopping enabled
            ...
          }
}
```

A shared resource may be allocated in RRC configuration to a UE for Grant-free access (e.g., contention based) at RRC-INACTIVE state. An example of RRC configuration and re-configuration is shown below, using the shared resource at RRC-INACTIVE state for an mMTC device, which may need longer grant-free time interval with very low duty cycle but fewer frequency resources.

```
RRCConnectionSuspend-r8 ::= SEQUENCE {                      // Switch to RRC INACTIVE
        ...
    radioResourceConfigShared RadioResourceConfigShared OPTIONAL,
        ...
}
...
RRCInactiveReconfiguration-r8 ::= SEQUENCE {                // Configure or Reconfigure at
RRC_INACTIVE
    ...
    radioResourceConfigShared RadioResourceConfigShared OPTIONAL,
        ...
}
RadioResourceConfigShared ::= SEQUENCE {                    // Shared resource at RRC_INACTIVE
        ...
        grantfree-Config Grantfree-Config OPTIONAL,
        ...
}
Grantfree-Config ::= SEQUENCE {                             // Grant-free configuration
        grantfreeC-RNTI grantfreeC-RNTI OPIIONAL,           // Grant-free C-RNTI to UE
        grantfree-ConfigUL Grantfree-ConfigUL OPTIONAL
}
Grantfree-ConfigUL ::= CHOICE {
        release NULL,
        setup SEQUENCE {
GrantfreeTimeIntervalUL ENUMERATED {                        // $t_{GTI}$ values in subframe
        sf100, sf200, sf300, sf400, sf600, sf800, sf1000, sf2000, sf4000, sf8000,
            spare6, spare5, spare4, spare3, spare2, spare1},
GrantfreeTimeStartUL ENUMERATED {                           // $t_{Start}$ values in subframe
        sf1, sf2, sf3, sf4, sf5, sf6, sf7, sf8, sf9, sf10, spare6, spare5,
            spare4, spare3, spare2, spare1},
GrantfreeTimeAccessUL ENUMERATED {                          // $t_{Access}$ values in subframe
        sf10, sf20, sf30, sf40, sf50, sf60, sf70, sf80, sf90, sf100, spare6, spare5,
            spare4, spare3, spare2, spare1},
...
GrantfreeFrequencyRangeUL ENUMERATED {                      // $f_{GFR}$ values in RBG
        rbg2, rbg4, rbg6, rbg8, rbg10, rbg20, rbg30, rbg40, rbg50, rbg60, spare6,
            spare5, spare4, spare3, spare2, spare1},
GrantfreeFrequencyStartUL ENUMERATED {                      // $f_{Start}$ values in RB
        rb1, rb2, rb3, rb4, rb5, rb6, rb7, rb8, rb9, rb10, spare6, spare5, spare4,
            spare3, spare2, spare1},
GrantfreeFrequencyAccessUL ENUMERATED {                     // $f_{Access}$ values in RBG
        rbg1, rbg2, rbg3, rbg4, rbg5, rbg10, rbg15, rbg20, rbg25, rbg30, spare6,
            spare5, spare4, spare3, spare2, spare1},
...
GrantfreeUeDmrsStateUL SEQUENCE {01110010...0},             // DMRS initial state
...
GrantfreeHarqProNumberUL INTEGER (0..8) {4},                // HARQ process number = 4
GrantfreeHarqRvUL INTEGER (0..8) {1},                       // RV = 1
...
GrantfreeMaxRepetitionUL INTEGER (0..8) {0},                // no repetition
...
GrantfreeMcsUL ENUMERATED {                                 // MCS
spare5, spare4, spare3, spare2, spare1},
```

-continued

```
GrantfreeTbUL ENUMERATED {                    // TB size
        tb1, tb2, tb3, tb4, tb5, tb6, tb7, tb8, tb9, tb10, spare6, spare5, spare4, spare3,
     spare2, spare1},
...
GrantfreeTimeRefUL ENUMERATED {               // time reference
        tr1, tr2, tr3, tr4, spare4, .spare3, spare2, spare1},
...
GrantfreeTrPower0UL ENUMERATED {              // target power P0 for UE
        tp1, tp2, tp3, tp4, spare4, spare3, spare2, spare1},
GrantfreePowerRefUL ENUMERATED {              // reference power for pathloss
        pr1, pr2, pr3, pr4, spare4, spare3, spare2, spare1},
GrantfreePowerIncUL ENUMERATED {              // Power Increment
        pi1, pi2, pi3, pi4, spare4, spare3, spare2, spare1},
...
GrantfreeFreqChannelUL SEQUENCE (1, 11},      // first field bit 1: contention based; second
field bits "11" priority level
...
GrantfreeFreqHopUL CHOICE (Setup},            // frequency hopping setup
Setup SEQUENCE {                              // Setup: enable and pattern for frequency hopping
...
     },
...
 } }
```

Grant-free access allocation may be dynamically configured and activated, re-activated, and/or de-activated by the access network via the DCIs on the down link NR-PDCCH. An example of DCIs which may be scrambled with GrantfreeC-RNTI for Grant-free UL are shown in the Table 4.

TABLE 4

DCI Formats Configured by GrantfreeC-RNTI.

| DCI Format | Usage | Major Contents |
|---|---|---|
| Format 0D | UL Grant-free Resource Allocation Activation/Re-activation/Deactivation | RB Assignment, TPC, PUSCH Hopping Flag |
| Format 3 | UL Grant-free TPC Commands for PUCCH and PUSCH with 2 bit power adjustment | Power Control Only |

TABLE 4-continued

DCI Formats Configured by GrantfreeC-RNTI.

| DCI Format | Usage | Major Contents |
|---|---|---|
| Format 3A | UL Grant-free TPC Commands for PUCCH and PUSCH with 1 bit power adjustment | Power Control Only |
| Format 4 | UL Grant-free Assignment for UL MIMO (up to 4 layers) | RB Assignment, TPC, HARQ, Precoding Information |

Table 5 and Table 6 illustrate an example of DCI Format 0D enhanced from Format 0 for Grant-free Resource Allocation configuration and Activation, Re-activation, and/or Deactivation.

TABLE 5

DCI Format 0D for Grant-free Configuration

| DCI Format 0D | Bits | Comment |
|---|---|---|
| Carrier Indicator | 0 or 3 | Grant-free on multi-carriers |
| Flag for format0D/format1A differentiation | 1 | "0" for Format 0D |
| Hopping flag | 1 | Grant-free with frequency hopping |
| Resource block assignment | Varies for different schemes. e.g., for RIV based scheme $\lceil \log_2(N_{RB}^{UL}(N_{RB}^{UL}+1)/2) \rceil$ | Contiguous allocation schemes may be used for DFT-SC-OFDM waveform. Both Contiguous and noncontiguous schemes may be used for PC-OFDM waveform |
| MCS and RV | 5 | for Grant-free UL |
| NDI (New Data Indicator) | 1 | for Grant-free UL |
| Trransmit Power Control (TPC) for PUSCH | 2 | for Grant-free UL power control |
| Cyclic shift for DMRS | 3 | For Grant-free UE's DMRS |
| UL SPS configuration index | 3 | for Grant-free UL SPS configuration |
| UL index (TDD only) | 3 | for Grant-free UL in TDD |
| Downlink Assignment Index (DAI) | 2 | for Grant-free UL in TDD |
| CSI request (1 or 2 bits: 2 bit is for multi carrier) | 1, 2, 3, 4, or 5 | for Grant-free UL CSI if configured |
| SRS request | 3 | for Grant-free UL SRS |

TABLE 5-continued

DCI Format 0D for Grant-free Configuration

| DCI Format 0D | Bits | Comment |
| --- | --- | --- |
| Resource allocation type | 2 | To support different schemes for both PC-OFDM and DFT-SC-OFDM waveforms |
| Cyclic Shift Field mapping for DMRS | 1 | For Grant-free UE's DMRS |
| Beam Indicator | 2~4 | To indicate beam association, pairing, and/or QCL, e.g. beam index, beam pair index, port, etc. |
| Transport block size | 4 | Configure the TBS value(s) for each Grant-free resource allocation |
| Repetition number | 3 | Max. repetition K |
| HARQ process number | 3 | Support up to 8 HARQs |
| Channel Access type | 1 | Contention or non-contention |
| Channel Access Priority Class | 2 | Contention based priority accessing |

TABLE 6

DCI Format 0D for Grant-free Resource and Deactivation

| DCI Format 0D | Activation | Deactivation |
| --- | --- | --- |
| TPC for PUSCH | set to '00' | set to '00' |
| Cyclic shift for DM RS | set to '000' if present | set to '000' if present |
| MCS and RV | MSB is set to '0' | set to '11111' |
| Resource block assignment and hopping resource allocation | N/A | Set to all '1's |

Note: if the reserved bit values in Table 6 for Activation are never configured for Grant-free configuration, then the DCI 0D in Table 5 may be configured with TPC="00", Cyclic Shift DMRS="000", MSC and RV="0xxxx" for both configuring and activating purpose in one action.

Disclosed herein are Grant-free UL transmission operations. An example method performed at a user device for RRC configured grant-free UL transmissions may include establishing a secure connection to an access network; receiving, from the access network, a first Radio Resource Control (RRC) connection reconfiguration message comprising one or more grant-free configuration parameters of a grant-free configuration; storing, at the user equipment, the grant-free configuration; receiving, from the access network, a second RRC connection reconfiguration message comprising one or more grant-free configuration parameters of an updated grant-free configuration; and updating, at the user equipment, the stored grant-free configuration.

The access network may be one of a gNodeB (gNB) or a Transmission and Reception Point (TRP). The access network may update the grant-free configuration based on an update to one or more characteristics of the access network or the user equipment, the one or more characteristics comprising a resource utilization, a traffic flow, a service priority, and mobility and location information. The grant-free configuration parameters may comprise one or more of a grant free cellular network identifier, such as a Radio Network Temporary Identifier (C-RNTI) and an indication of a resource allocation. The method may further comprise receiving, from the access network and in response to expiration of the timer, an instruction from the access network to switch from the RRC connected state to the RRC inactive state. The method may further comprise switching, after updating the grant-free configuration stored at the user equipment, from the RRC inactive state to the RRC connected state. The method may further comprise sending, to the access network, an indication that the grant-free configuration has been updated. The method may further comprise receiving, from the access network and in response of decoding failure, an instruction from the access network to switch to grant based for retransmission. The method may further comprise, retransmitting according the uplink grant from the access network.

The grant-free configuration parameters may comprise one or more of a grant free cellular network identifier and an indication of a resource allocation associated with the grant free cellular network identifier. The indication of the resource allocation may comprise a resource allocation in time, frequency, and space. The resource allocation in time may comprise a start point in time and a length in time from the start point. The resource allocation in space may comprise one or more of an identifier of a beam and an index of a port associated with a beam. The grant-free configuration parameters may comprise a transmit power control configuration. The transmit power control configuration may comprise one or more of a target power, a power increment, a reference power, a scale to path loss, and a power beam index.

Figure 5:
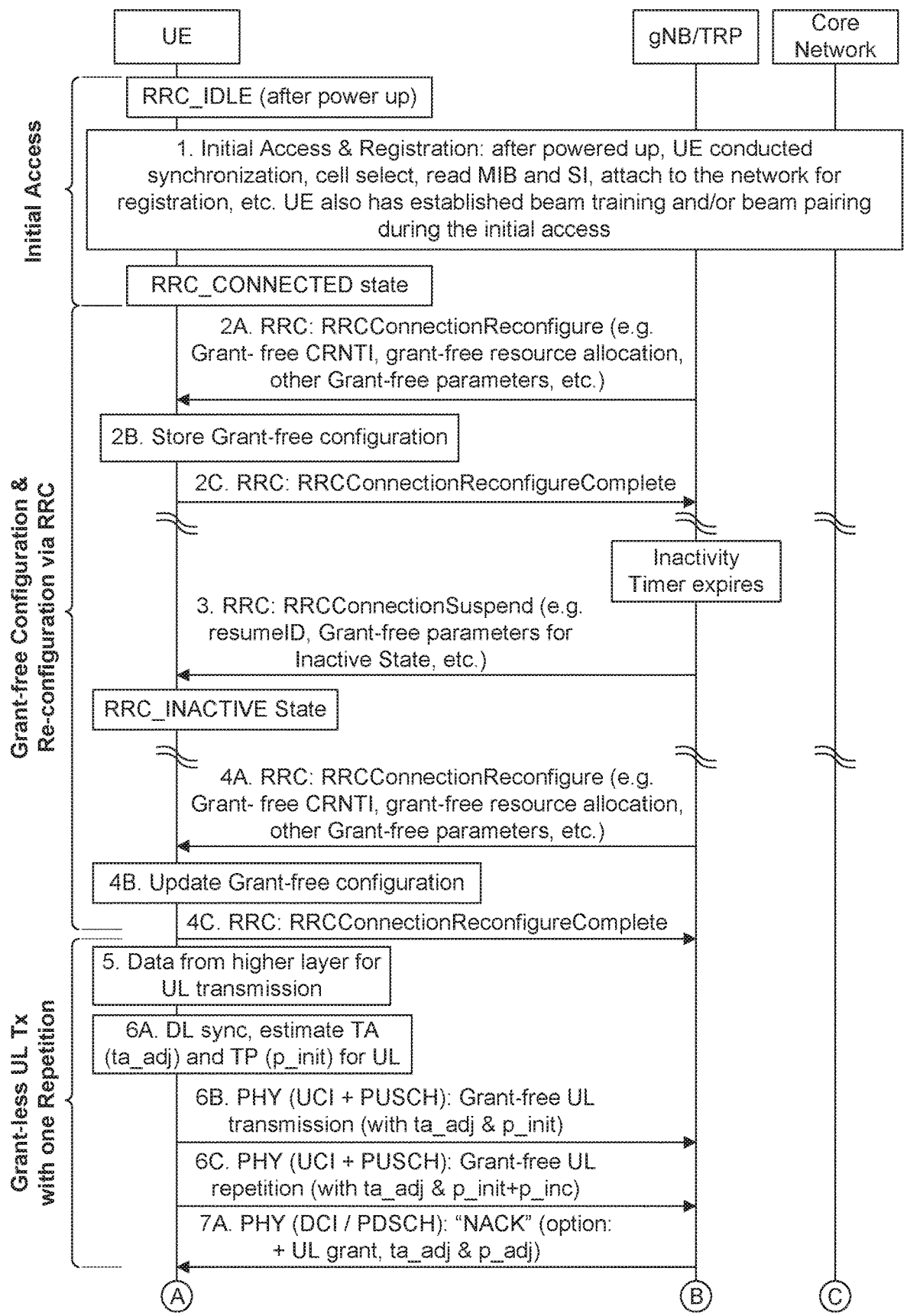
FIG. 5 shows example Grant-free UL operations configured by RRC signaling.
Figure 5:
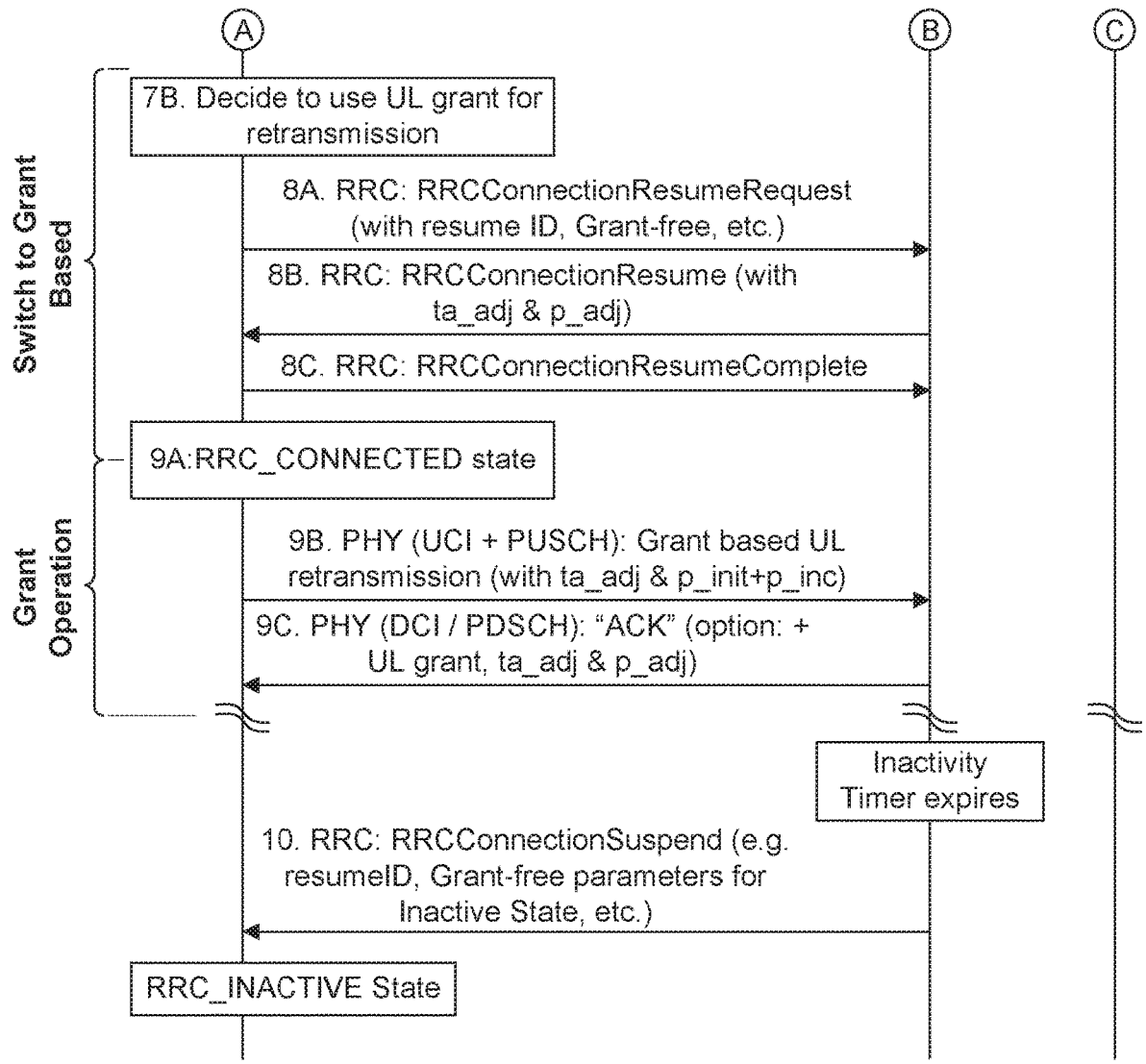

Grant-free access allocation may be configured and/or re-configured by the access network (e.g., gNB) via RRC signaling at any time, i.e. either at RRC-CONNECTED state or RRC-INACTIVE state. An example of RRC configured Grant-free UL transmissions at RRC-INACTIVE state are illustrated in FIG. 5, which contains the following steps:

At step 1, an initial access and registration procedure occurs. After power up, the UE may be at an RRC-IDLE state and may start an Initial Access procedure to establish a secured connection with the access network (e.g., gNB or TRP) and may register with the Core Network (CN) via an "attach" procedure. The UE may be at RRC-CONNECTED state once the secured connection is established.

At step 2, the eNB/TRP may send a Grant-free configuration Grantfree-Config to the UE via an RRCConnectionReconfiguration message with the Grant-free configuration parameters, such as grantfreeC-RNTI and resource allocation in time and frequency, and other grant-free operation configurations such as DMRS, HARQ, repetition, MCS, power, and frequency hopping, etc. within Grantfree-ConfigUL. The UE may store the Grant-free configuration and acknowledge the gNB/TRP via an RRCConnectionReconfigureComplete message.

At step 3, the gNB/TRP may direct the UE to transfer from RRC-CONNECTED state to RRC-INACTIVE state by RRCConnectionSuspend message when the "Inactive Timer" expires, which may carry resume ID for UE to use later for resuming the RRC-CONNECTED state and some grant-free context or parameter setting for Inactive State. The UE may transfer to RRC-INACTIVE state afterwards.

At step 4, the gNB/TRP may reconfigure the Grant-free configuration due to network or UE status, such as resource utilization, traffic flow, service priority, UEs in service, UE's mobility and location, etc., via RRCConnectionReconfiguration message. UE may update the Grant-free configuration Grantfree-Config accordingly and confirm the reconfiguration via RRCConnectionReconfigurationComplete message. This RRC reconfiguration process may trigger the UE to resume to RRC-CONNECTED state from RRC-INACTIVE state and then switch back to RRC-INACTIVE state, e.g. an indication from the access network may instruct the UE to resume to RRC-CONNECTED state for the RRC reconfiguration process.

At step 5, the UE may receive data ready for UL transmission from its higher layer either currently at RRC-CONNECTED or RRC-INACTIVE state. If the UE is at RRC-CONNECTED state, step 8A, 8B, 8C and 9A may be skipped.

At step 6, the UE may conduct quick synchronization with the Primary Synchronization Signal (PSS) and Secondary Synchronization Signal (SSS) of Synchronization Signal (SS) block or Reference Signals such as Channel State Information-Reference Signal (CSI-RS) available on the DL, estimate the TA (e.g., ta_adj) and initial transmit power (e.g., p_init) based on the measurements with PSS/SSS of an SS block or CSI-RS on the down link for the initial transmission. For higher reliability services, the UE may send UL data with repetition(s) with same or adjusted transmit power level (e.g., p_init+p_inc) per the Grant-free power control configuration, as shown as step 6C, before receiving any "ACK" or "NACK" from gNB/TRP. Note that the UE may use the same Grant-free resource allocation, (e.g., within the same $t_{Access}$) or different allocation for repetition transmissions if gNB/TRP configures multiple grant-free UL resource allocations.

At step 7, the gNB/TRP may have failed to decode the received data and responds back with a "NACK" and a UL grant on the same message at step 7A. The gNB/TRP may also include TA adjustment (e.g., ta_adj) for uplink timing alignment and power adjustment (e.g., p_adj) for closed loop power control on this feedback control message carried by the DCI scrambled by grantfreeC-RNTI. The UE may switch to grant based UL for retransmission at step 7B.

At step 8, the UE may transfer from RRC-INACTIVE to RRC-CONNECTED state for grant based UL retransmission via RRCConnectionResumeRequest with the resume ID and some Grant-free context at step 8A. The gNB/TRP may confirm it with RRCConnectionResume (optionally with ta_adj and p_adj) at step 8B, and UE may finish it with RRCConnectionResureComplete at step 8C. The UE may enter into RRC-CONNECTED state.

At step 9, the UE may retransmit the data and get acknowledged by the gNB/TRP on dedicated resources granted by the gNB/TRP.

At step 10, the gNB/TRP may direct the UE to transfer back to RRC-INACTIVE state after the "Inactive Timer" expires. The UE may enter the RRC-INACTIVE state.

Disclosed herein are Grant-free Operations with PHY Signaling.

Figure 6:
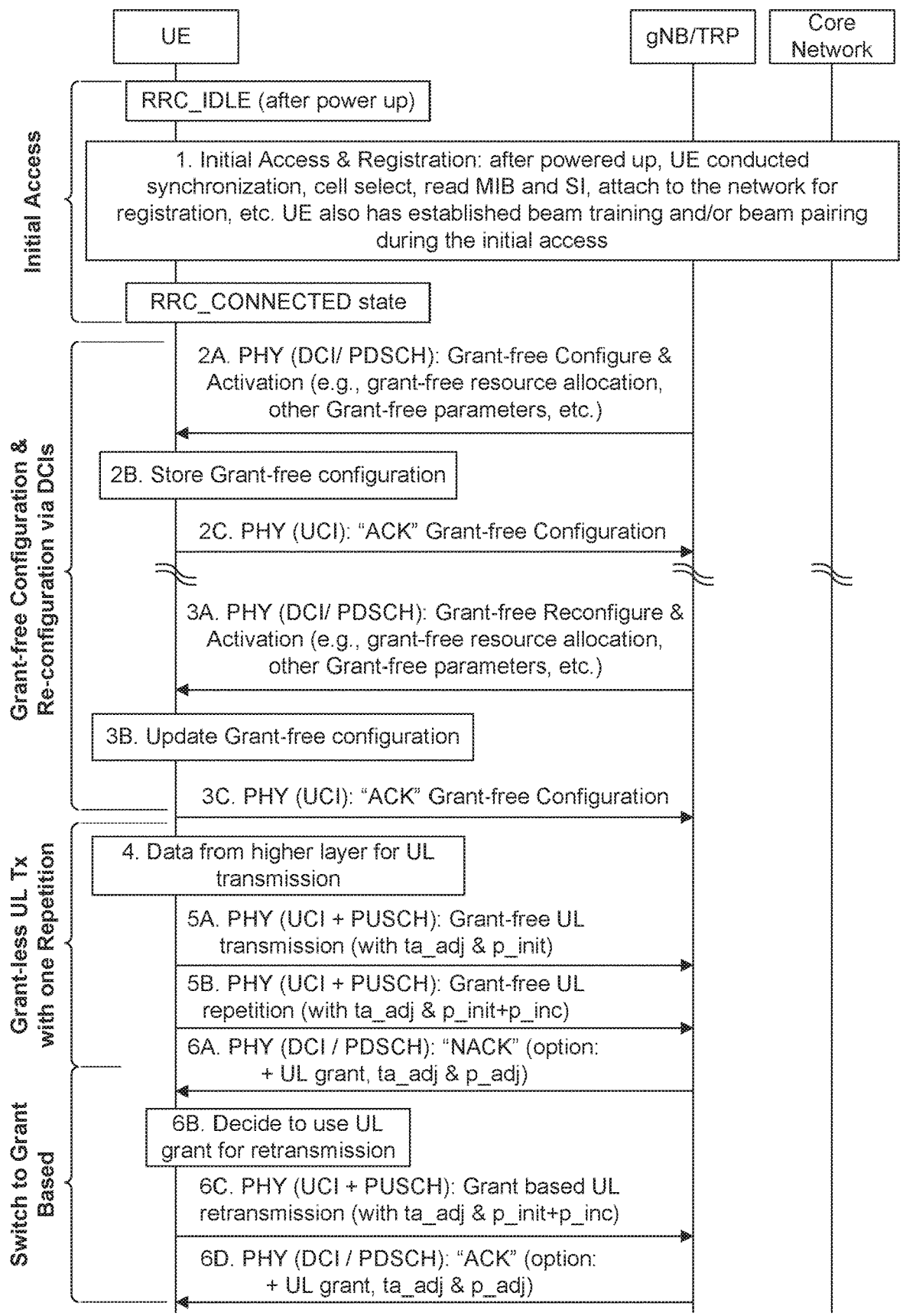
FIG. 6 shows example Grant-free UL operations dynamically configured by DCIs.

Grant-free access allocation may be dynamically configured and activated or deactivated by the access network (e.g., gNB) via downlink control signaling (e.g., DCI scrambled with grantfreeC-RNTI) at any time. An example of Grant-free UL transmissions dynamically signaled by DCIs is illustrated in FIG. 6, which may contain the following steps:

At step 1, an initial access and registration procedure may be initiated. After power up, the UE is at RRC-IDLE state and may start Initial Access procedure(s) to establish secured connection with the access network, (e.g., gNB or TRP) and makes registration with the Core Network (CN) via an "attach" procedure. The UE may be at RRC-CONNECTED state once the secured connection is established.

At step 2, the eNB/TRP may send a Grant-free configuration to the UE via PHY layer signaling DCIs on PDCCH or PDSCH, e.g. DCI Format 0D proposed in Table 5 and Table 6 for configuring and activating the Grant-free access allocation. The UE may scramble the DCI with grantfreeC-RNTI successfully and decode the message, and then store the Grant-free configuration parameters and acknowledges the gNB/TRP via an "ACK" on UL, e.g., with Uplink Control Information (UCI).

At step 3, the gNB/TRP may reconfigure the Grant-free access allocation due to network or UE status, such as resource utilization, traffic flow, service priority, UEs in service, UE's mobility and location, etc., via DCIs such as DCI Format 0D. UE may update the Grant-free configuration accordingly and confirm the reconfiguration via an "ACK" on UL.

Note that the gNB/TRP may deactivate explicitly the previously configured resource allocation by sending a DCI for deactivation, and then reconfigure a new resource allocation and a DCI for activation. Also, the gNB may reconfigure the resource allocation and activate it without explicitly deactivating the previous configuration. The UE will always store the latest configured values for Grant-free configurations.

At step 4, the UE may receive data for grant-free UL transmission from its higher layer.

At step 5, Grant-free UL Transmission may be performed. The UE may conduct quick synchronization with the NR-SS block or Reference Signals available on the DL, estimate the TA (e.g., ta_adj) and initial transmit power (e.g., p_init) based on the path loss measured on the downlink reference signal such as PSS/SSS or CSI-RS for the initial transmission. For higher reliability services, the UE may send UL data with repetition(s) with same or adjusted transmit power level (e.g., p_init+p_inc) per the Grant-free power control configuration, as shown as step 5B, before receiving any "ACK" or "NACK" from gNB/TRP. Note that the UE may use the same Grant-free resource allocation, or different allocation for repetition transmissions if gNB/TRP configures multiple grant-free UL resource allocations.

At step 6, the gNB/TRP may have failed to decode the received data and responds back with a "NACK" and also may send a UL grant on the DL channel, e.g. PDCCH/PDSCH, at step 6A. The gNB/TRP may also include TA adjustment (e.g., ta_adj) and power adjustment (e.g., p_adj) on the feedback. The UE switches to grant based UL for retransmission at step 6B. The UE retransmits the data at step 6C and gets acknowledged by the gNB/TRP on dedicated resources granted by the gNB/TRP at step 6D.

Figure 7:
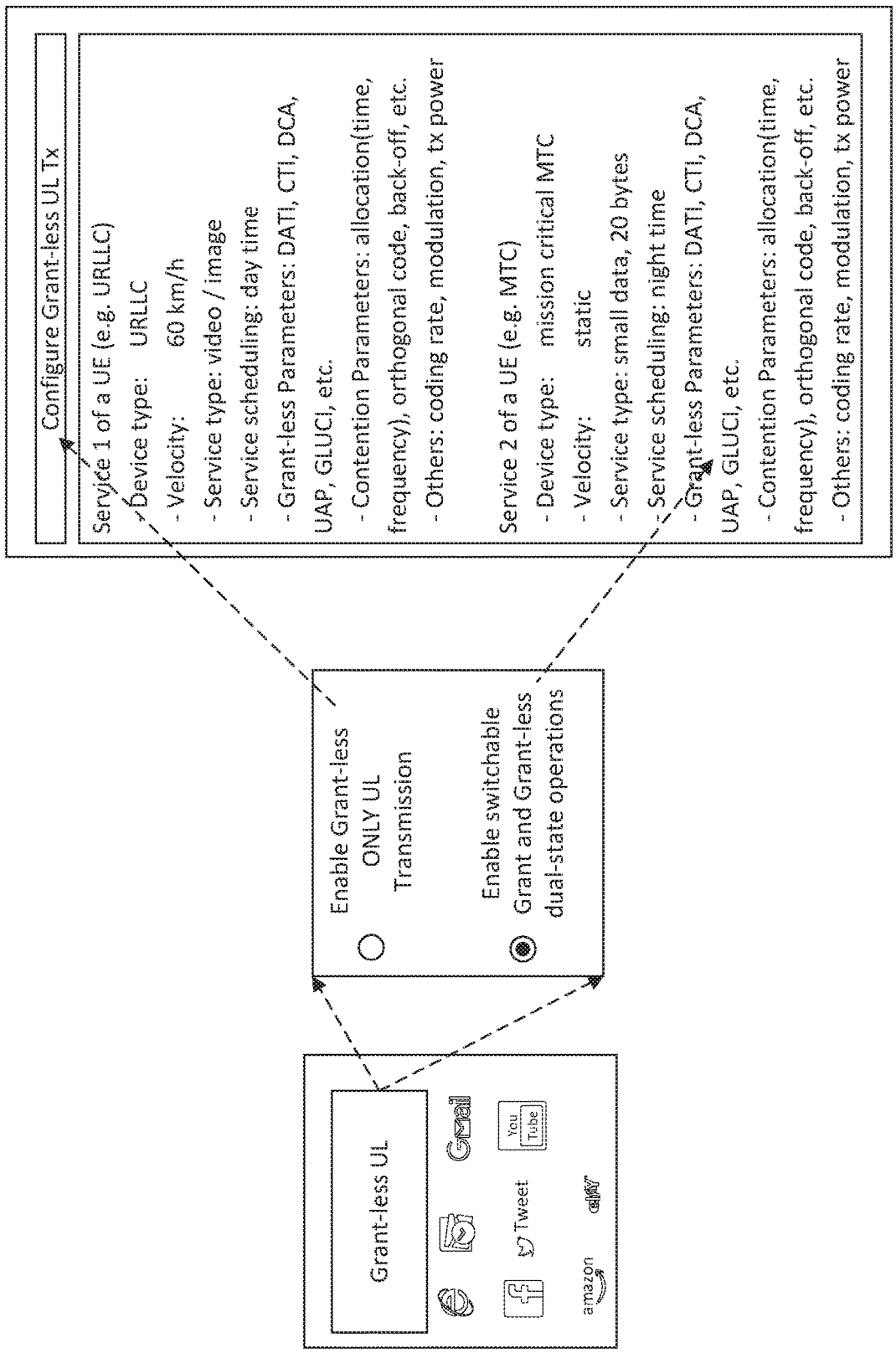
FIG. 7 shows an example Graphical User Interface for UE configuration.

An example of the GUI used for configuring UE's grant-less operations is shown in FIG. 7.

The following is a list of acronyms that may be referenced in the detailed description above. Unless otherwise specified, the acronyms used herein refer to the corresponding term listed below:

C-RNTI Cellular-Radio Network Temporary Identifier
DCI Downlink Control Information
eNB Evolved Node B
gNB gNodeB
LTE Long Term Evolution
MAC Medium Access Control
mMTC Massive Machine Type Communication
NACK Negative Acknowledgement
NR New Radio
OOC Orthogonal Cover Code
OFDM Orthogonal Frequency Division Multiplex
PDCCH Physical Downlink Control Channel
PDSCH Physical Downlink Shared Channel
PHY Physical Layer
PRB Physical Resource Block
PUCCH Physical Uplink Control Channel
PUSCH Physical Uplink Shared Channel
RAN Radio Access Network (3GPP)
RB Resource Block
RNTI Radio Network Temporary Identifier
RRC Radio Resource Control
SI System Information
SFN System Frame Number
TRP Transmission and Reception Point
UCI Uplink Control Information
UE User Equipment
UL Uplink
URLLC Ultra-Reliable and Low Latency Communications This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A user equipment apparatus (UE), comprising a processor, a memory, communication circuitry, and computer-executable instructions stored in the memory which, when executed by the processor, cause the UE to:
   receive a first allocation, the first allocation pertaining to physical resources for grant-free access, the first allocation comprising a set of time resource configurations and a set of frequency resource configurations;
   determine, based at least in part on the first allocation, a second allocation, the second allocation being a physical resource configuration for a data packet transmission;
   send, at a first time and frequency resource of the second allocation, a data packet; and
   send, based upon a repetition indication, the data packet at one or more additional time and frequency resources of the second allocation.

2. The UE of claim 1, wherein the set of time resources comprises one or more of: a set of durations; a set of starting times; and a set of time windows.

3. The UE of claim 2, wherein a duration further comprises one or more time windows.

4. The UE of claim 2, wherein a starting time further indicates the beginning of a time window.

5. The UE of claim 2, wherein a time window allows access for a grant-free initial transmission or a repetition transmission.

6. The UE of claim 1, wherein the set of frequency allocations comprises one or more of: a set of frequency ranges, and a set of start frequencies and bandwidths.

7. The UE of claim 6, wherein a frequency range comprises one or more resource blocks (RBs) or resource block groups (RBGs), the RB(s) or RBG(s) being allocated for grant-free access.

8. The UE of claim 6, wherein a start frequency is the first RB or RBG of a frequency range.

9. The UE of claim 1, wherein the instructions further cause the UE to receive the first allocation via radio resource control (RRC) messaging.

10. The UE of claim 1, wherein the instructions further cause UE to receive, via a downlink control information (DCI) on a physical down link control channel (PDCCH), the first allocation.

11. The UE of claim 10, wherein the instructions further cause UE to:
    receive, via the DCI, an indication to activate or deactivate the first allocation; and
    based on the indication to activate or deactivate the first allocation, use or release the first allocation.

12. The UE of claim 11, wherein the indication to activate or deactivate the first allocation is an indication to deactivate the first allocation and comprises a modulation and coding scheme, wherein each bit of the modulation and coding scheme is set to one.

13. The UE of claim 11, wherein the indication to activate or deactivate the first allocation further is an indication to deactivate the first allocation and comprises a resource block assignment, wherein each bit of the resource block assignment is set to one.

14. The UE of claim 10, wherein the DCI is scrambled with a radio network temporary identification (RNTI) for grant-free access.

15. The UE of claim 10, wherein the DCI comprises a priority for transmission.

* * * * *

UNITED STATES PATENT AND TRADEMARK OFFICE
CERTIFICATE OF CORRECTION

| | | |
|---|---|---|
| PATENT NO. | : 11,388,705 B2 | Page 1 of 1 |
| APPLICATION NO. | : 16/637875 | |
| DATED | : July 12, 2022 | |
| INVENTOR(S) | : Qing Li et al. | |

It is certified that error appears in the above-identified patent and that said Letters Patent is hereby corrected as shown below:

On the Title Page

Page 2, under item (56), In Other Publications, Column No. 2, Line no. 6, Replace:
"control (RRC) Protocol"
With:
-- control (RRC); Protocol --

Signed and Sealed this
Twentieth Day of September, 2022

*Katherine Kelly Vidal*

Katherine Kelly Vidal
*Director of the United States Patent and Trademark Office*